US012657707B2

(12) United States Patent  
Semenov et al.

(10) Patent No.: US 12,657,707 B2  
(45) Date of Patent: Jun. 16, 2026

(54) THREE-DIMENSIONAL DENTAL MODEL SEGMENTATION QUALITY ASSESSMENT

(71) Applicant: Align Technology, Inc., San Jose, CA (US)

(72) Inventors: Andrei Semenov, Moscow (RU); Denis Durdin, Novosibirsk (RU); Jason Ramos, San Francisco Heredia (CR); Sergio Santamaria Venegas, San Jose (CR)

(73) Assignee: Align Technology, Inc., San Jose, CA (US)

( * ) Notice: Subject to any disclaimer, the term of this patent is extended or adjusted under 35 U.S.C. 154(b) by 60 days.

(21) Appl. No.: 18/424,707

(22) Filed: Jan. 26, 2024

(65) Prior Publication Data

US 2024/0257342 A1     Aug. 1, 2024

Related U.S. Application Data

(60) Provisional application No. 63/481,797, filed on Jan. 26, 2023.

(51) Int. Cl.
| | |
|---|---|
| *G06T 7/00* | (2017.01) |
| *A61C 9/00* | (2006.01) |
| *G06F 18/241* | (2023.01) |
| *G06T 7/11* | (2017.01) |
| *G06T 19/20* | (2011.01) |

(52) U.S. Cl.  
CPC .......... *G06T 7/0012* (2013.01); *A61C 9/0046* (2013.01); *G06F 18/241* (2023.01); *G06T 7/11* (2017.01); *G06T 19/20* (2013.01); *G06T*

*2207/20081* (2013.01); *G06T 2207/30036* (2013.01); *G06T 2207/30168* (2013.01)

(58) Field of Classification Search  
CPC ......... G06T 7/0012; G06T 7/11; G06T 19/20; G06T 2207/20081; G06T 2207/30036; G06T 2207/30168; A61C 9/0046; A61C 7/002; G06F 18/241  
See application file for complete search history.

(56) References Cited

U.S. PATENT DOCUMENTS

| | | | |
|---|---|---|---|
| 5,975,893 A | 11/1999 | Chishti et al. | |
| 6,227,850 B1 | 5/2001 | Chishti et al. | |
| 6,227,851 B1 | 5/2001 | Chishti et al. | |
| 6,299,440 B1 | 10/2001 | Phan et al. | |
| 6,318,994 B1 | 11/2001 | Chishti et al. | |
| 6,371,761 B1 | 4/2002 | Cheang et al. | |
| 6,386,878 B1 | 5/2002 | Pavlovskaia et al. | |
| 6,406,292 B1 | 6/2002 | Chishti et al. | |
| 6,409,504 B1 | 6/2002 | Jones et al. | |

(Continued)

FOREIGN PATENT DOCUMENTS

WO          9858596 A1     12/1998

*Primary Examiner* — Vijay Shankar  
(74) *Attorney, Agent, or Firm* — Shay Glenn LLP

(57)          ABSTRACT

Provided herein are apparatuses (e.g., systems) and methods for automatically assessing a segmented 3D dental model. The segmented 3D dental model may be classified by a trained machine learning classifier (a trained neural network). In some cases, the segmented 3D dental model may be classified as a passing (acceptable) or failing (unacceptable) model. The machine learning classifier may be trained with labeled 3D dental models that illustrate passing and failing segmented 3D dental models.

26 Claims, 32 Drawing Sheets

(56) References Cited

U.S. PATENT DOCUMENTS

| | | | |
|---|---|---|---|
| 6,457,972 B1 | 10/2002 | Chishti et al. | |
| 6,488,499 B1 | 12/2002 | Miller | |
| 6,514,074 B1 | 2/2003 | Chishti et al. | |
| 6,554,611 B2 | 4/2003 | Chishti et al. | |
| 6,582,229 B1 | 6/2003 | Miller et al. | |
| 6,602,070 B2 | 8/2003 | Miller et al. | |
| 6,621,491 B1 | 9/2003 | Baumrind et al. | |
| 6,688,886 B2 | 2/2004 | Hughes et al. | |
| 6,726,478 B1 | 4/2004 | Isiderio et al. | |
| 6,729,876 B2 | 5/2004 | Chishti et al. | |
| 6,739,869 B1 | 5/2004 | Taub et al. | |
| 6,767,208 B2 | 7/2004 | Kaza | |
| 6,783,360 B2 | 8/2004 | Chishti | |
| 7,040,896 B2 | 5/2006 | Pavlovskaia et al. | |
| 7,063,532 B1 | 6/2006 | Jones et al. | |
| 7,074,038 B1 | 7/2006 | Miller | |
| 7,074,039 B2 | 7/2006 | Kopelman et al. | |
| 7,077,647 B2 | 7/2006 | Choi et al. | |
| 7,108,508 B2 | 9/2006 | Hedge et al. | |
| 7,134,874 B2 | 11/2006 | Chishti et al. | |
| 7,156,661 B2 | 1/2007 | Choi et al. | |
| 7,160,107 B2 | 1/2007 | Kopelman et al. | |
| 7,241,142 B2 | 7/2007 | Abolfathi et al. | |
| 7,293,988 B2 | 11/2007 | Wen | |
| 7,309,230 B2 | 12/2007 | Wen | |
| 7,357,634 B2 | 4/2008 | Knopp | |
| 7,555,403 B2 | 6/2009 | Kopelman et al. | |
| 7,637,740 B2 | 12/2009 | Knopp | |
| 7,689,398 B2 | 3/2010 | Cheng et al. | |
| 7,736,147 B2 | 6/2010 | Kaza et al. | |
| 7,746,339 B2 | 6/2010 | Matov et al. | |
| 7,844,356 B2 | 11/2010 | Matov et al. | |
| 7,844,429 B2 | 11/2010 | Matov et al. | |
| 7,865,259 B2 | 1/2011 | Kuo et al. | |
| 7,878,804 B2 | 2/2011 | Korytov et al. | |
| 7,880,751 B2 | 2/2011 | Kuo et al. | |
| 7,904,308 B2 | 3/2011 | Arnone et al. | |
| 7,930,189 B2 | 4/2011 | Kuo | |
| 7,942,672 B2 | 5/2011 | Kuo | |
| 7,970,627 B2 | 6/2011 | Kuo et al. | |
| 7,970,628 B2 | 6/2011 | Kuo et al. | |
| 8,038,444 B2 | 10/2011 | Kitching et al. | |
| 8,044,954 B2 | 10/2011 | Kitching et al. | |
| 8,075,306 B2 | 12/2011 | Kitching et al. | |
| 8,092,215 B2 | 1/2012 | Stone-Collonge et al. | |
| 8,099,268 B2 | 1/2012 | Kitching et al. | |
| 8,108,189 B2 | 1/2012 | Chelnokov et al. | |
| 8,126,726 B2 | 2/2012 | Matov et al. | |
| 8,260,591 B2 | 9/2012 | Kass et al. | |
| 8,275,180 B2 | 9/2012 | Kuo | |
| 8,401,826 B2 | 3/2013 | Cheng et al. | |
| 8,439,672 B2 | 5/2013 | Matov et al. | |
| 8,562,338 B2 | 10/2013 | Kitching et al. | |
| 8,591,225 B2 | 11/2013 | Wu et al. | |
| 8,788,285 B2 | 7/2014 | Kuo | |
| 8,843,381 B2 | 9/2014 | Kuo et al. | |
| 8,874,452 B2 | 10/2014 | Kuo | |
| 8,896,592 B2 | 11/2014 | Boltunov et al. | |
| 8,930,219 B2 | 1/2015 | Trosien et al. | |
| 9,037,439 B2 | 5/2015 | Kuo et al. | |
| 9,060,829 B2 | 6/2015 | Sterental et al. | |
| 9,125,709 B2 | 9/2015 | Matty | |
| 9,211,166 B2 | 12/2015 | Kuo et al. | |
| 9,220,580 B2 | 12/2015 | Borovinskih et al. | |
| 9,364,296 B2 | 6/2016 | Kuo | |
| 9,375,300 B2 | 6/2016 | Matov et al. | |
| 9,414,897 B2 | 8/2016 | Wu et al. | |
| 9,492,245 B2 | 11/2016 | Sherwood et al. | |
| 9,642,678 B2 | 5/2017 | Kuo | |
| 10,248,883 B2 | 4/2019 | Borovinskih et al. | |
| 10,342,638 B2 | 7/2019 | Kitching et al. | |
| 10,463,452 B2 | 11/2019 | Matov et al. | |
| 10,595,966 B2 | 3/2020 | Carrier, Jr. et al. | |
| 10,617,489 B2 | 4/2020 | Grove et al. | |
| 10,722,328 B2 | 7/2020 | Velazquez et al. | |
| 10,758,322 B2 | 9/2020 | Pokotilov et al. | |
| 10,779,718 B2 | 9/2020 | Meyer et al. | |
| 10,792,127 B2 | 10/2020 | Kopelman et al. | |
| 10,828,130 B2 | 11/2020 | Pokotilov et al. | |
| 10,835,349 B2 | 11/2020 | Cramer et al. | |
| 10,973,611 B2 | 4/2021 | Pokotilov et al. | |
| 10,996,813 B2 | 5/2021 | Makarenkova et al. | |
| 10,997,727 B2 | 5/2021 | Xue et al. | |
| 11,020,205 B2 | 6/2021 | Li et al. | |
| 11,020,206 B2 | 6/2021 | Shi et al. | |
| 11,026,766 B2 | 6/2021 | Chekh et al. | |
| 11,033,359 B2 | 6/2021 | Velazquez et al. | |
| 11,071,608 B2 | 7/2021 | Derakhshan et al. | |
| 11,096,763 B2 | 8/2021 | Akopov et al. | |
| 11,116,605 B2 | 9/2021 | Nyukhtikov et al. | |
| 11,147,652 B2 | 10/2021 | Mason et al. | |
| 11,151,753 B2 | 10/2021 | Gao et al. | |
| 11,154,381 B2 | 10/2021 | Roschin et al. | |
| 11,259,896 B2 | 3/2022 | Matov et al. | |
| 11,357,598 B2 | 6/2022 | Cramer | |
| 11,395,717 B2 | 7/2022 | Yuryev et al. | |
| 11,432,908 B2 | 9/2022 | Kopelman et al. | |
| 11,464,604 B2 | 10/2022 | Makarenkova et al. | |
| 11,478,334 B2 | 10/2022 | Matov et al. | |
| 11,484,389 B2 | 11/2022 | Sterental et al. | |
| 11,521,732 B2 | 12/2022 | Levin et al. | |
| 11,534,272 B2 | 12/2022 | Li et al. | |
| 11,553,988 B2 | 1/2023 | Mednikov et al. | |
| 11,633,268 B2 | 4/2023 | Moalem et al. | |
| 11,642,195 B2 | 5/2023 | Gao et al. | |
| 11,651,494 B2 | 5/2023 | Brown et al. | |
| 11,654,001 B2 * | 5/2023 | Roschin | G16H 30/40 |
| | | | 433/214 |
| 11,707,344 B2 | 7/2023 | Roschin et al. | |
| 11,810,271 B2 | 11/2023 | Shi et al. | |
| 11,850,111 B2 | 12/2023 | Derakhshan et al. | |
| 11,991,439 B2 * | 5/2024 | Cramer | G06F 18/2431 |
| 2003/0008259 A1 | 1/2003 | Kuo et al. | |
| 2003/0143509 A1 | 7/2003 | Kopelman et al. | |
| 2003/0207227 A1 | 11/2003 | Abolfathi | |
| 2004/0137400 A1 | 7/2004 | Chishti et al. | |
| 2004/0152036 A1 | 8/2004 | Abolfathi | |
| 2004/0197728 A1 | 10/2004 | Abolfathi et al. | |
| 2004/0259049 A1 | 12/2004 | Kopelman et al. | |
| 2005/0182654 A1 | 8/2005 | Abolfathi et al. | |
| 2005/0244791 A1 | 11/2005 | Davis et al. | |
| 2006/0127836 A1 | 6/2006 | Wen | |
| 2006/0127852 A1 | 6/2006 | Wen | |
| 2006/0127854 A1 | 6/2006 | Wen | |
| 2006/0275731 A1 | 12/2006 | Wen et al. | |
| 2006/0275736 A1 | 12/2006 | Wen et al. | |
| 2008/0306724 A1 | 12/2008 | Kitching et al. | |
| 2010/0009308 A1 | 1/2010 | Wen et al. | |
| 2010/0068672 A1 | 3/2010 | Arjomand et al. | |
| 2010/0068676 A1 | 3/2010 | Mason et al. | |
| 2010/0092907 A1 | 4/2010 | Knopp | |
| 2010/0167243 A1 | 7/2010 | Spiridonov et al. | |
| 2013/0204599 A1 | 8/2013 | Matov et al. | |
| 2017/0273760 A1 | 9/2017 | Morton et al. | |
| 2018/0280118 A1 | 10/2018 | Cramer | |
| 2019/0328487 A1 | 10/2019 | Levin et al. | |
| 2019/0328488 A1 | 10/2019 | Levin et al. | |
| 2020/0107915 A1 * | 4/2020 | Roschin | A61C 13/34 |
| 2020/0155274 A1 | 5/2020 | Pimenov et al. | |
| 2020/0297458 A1 | 9/2020 | Roschin et al. | |
| 2020/0306011 A1 | 10/2020 | Chekhonin et al. | |
| 2021/0134436 A1 | 5/2021 | Meyer et al. | |
| 2022/0165388 A1 | 5/2022 | Chernov et al. | |
| 2023/0149127 A1 * | 5/2023 | Nikolskiy | A61C 13/34 |
| | | | 433/24 |
| 2024/0325125 A1 * | 10/2024 | Roschin | A61C 13/34 |
| 2025/0069288 A1 * | 2/2025 | Amelon | G06T 17/20 |

* cited by examiner

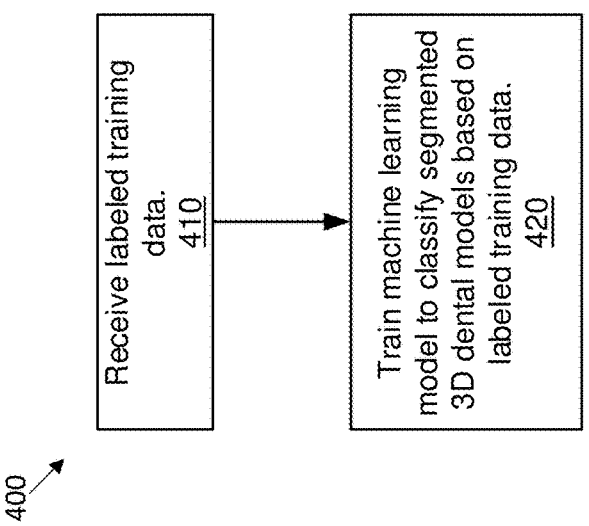

400

Receive labeled training data.
410

Train machine learning model to classify segmented 3D dental models based on labeled training data.
420

FIG. 4

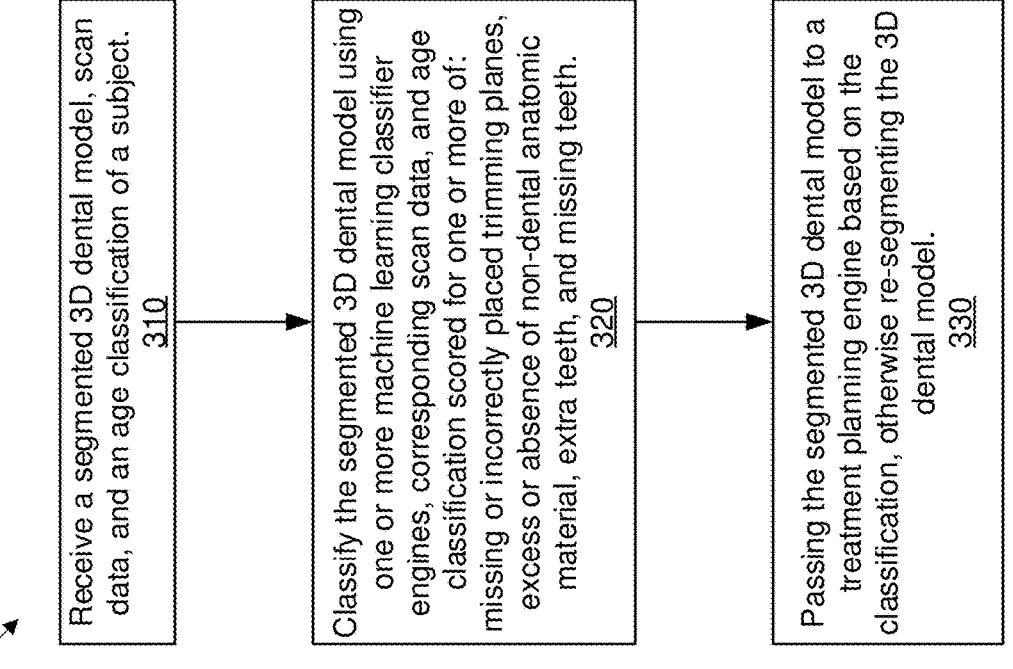

300

Receive a segmented 3D dental model, scan data, and an age classification of a subject.
310

Classify the segmented 3D dental model using one or more machine learning classifier engines, corresponding scan data, and age classification scored for one or more of: missing or incorrectly placed trimming planes, excess or absence of non-dental anatomic material, extra teeth, and missing teeth.
320

Passing the segmented 3D dental model to a treatment planning engine based on the classification, otherwise re-segmenting the 3D dental model.
330

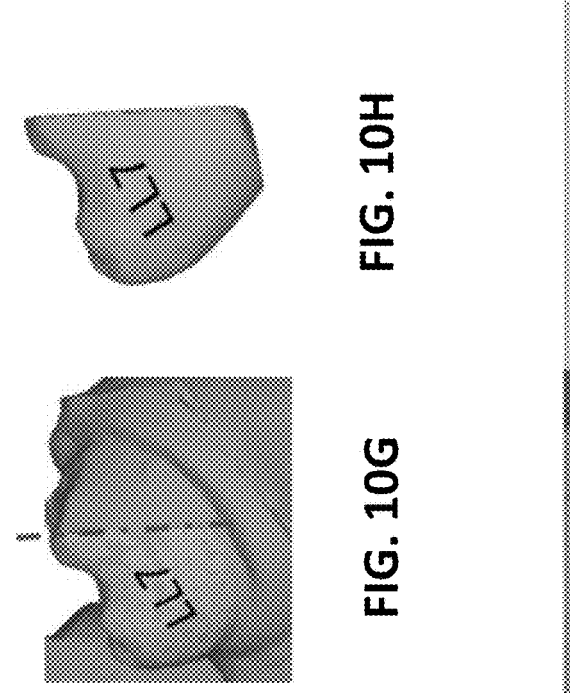
FIG. 10H
FIG. 10G
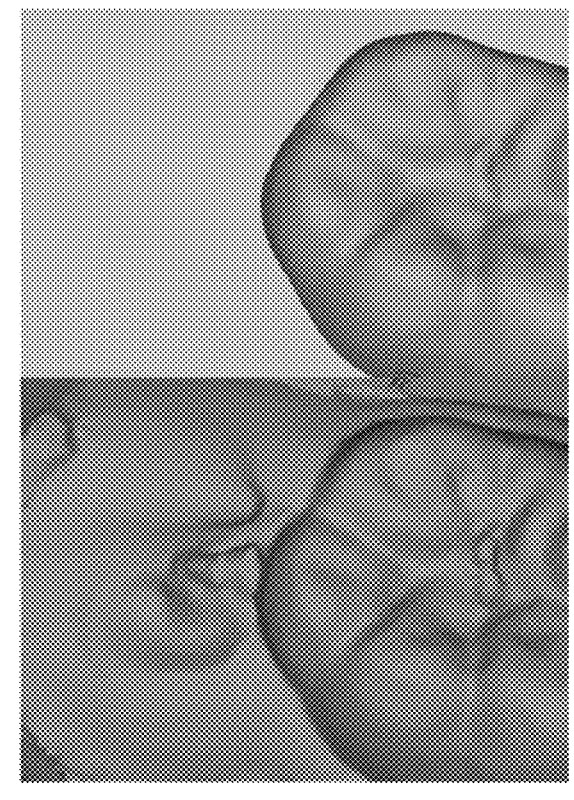
FIG. 10K
FIG. 10J
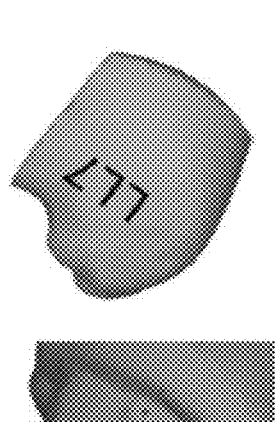
FIG. 10F
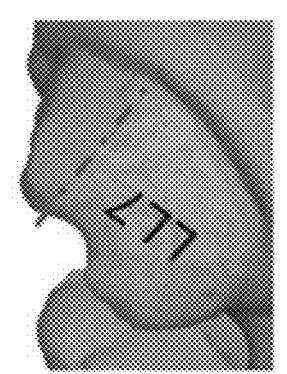
FIG. 10E
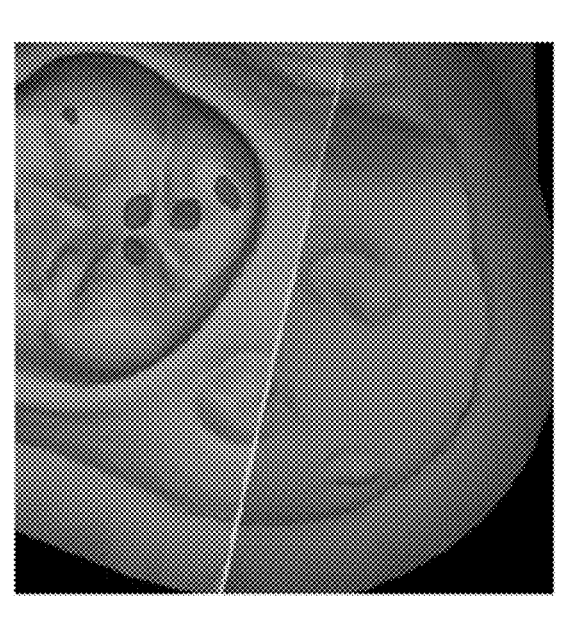
FIG. 10I

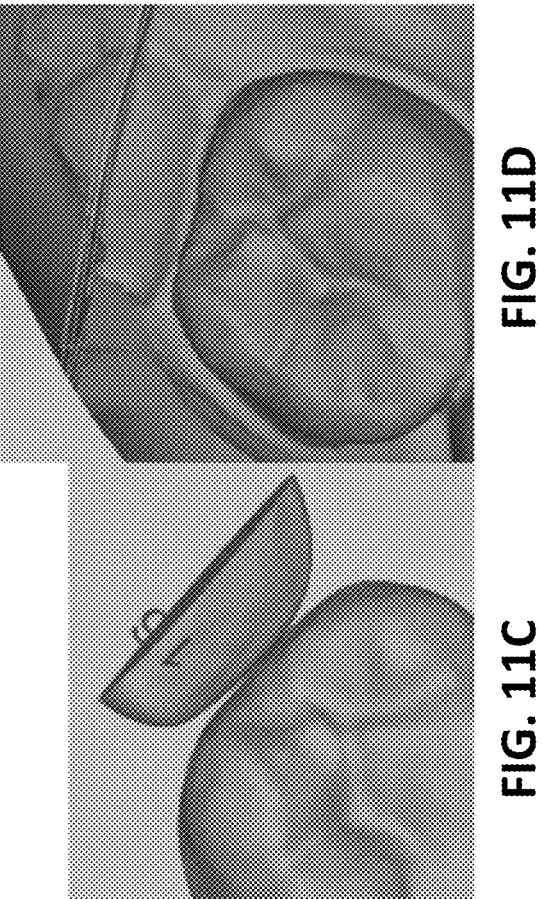
FIG. 11D
FIG. 11C
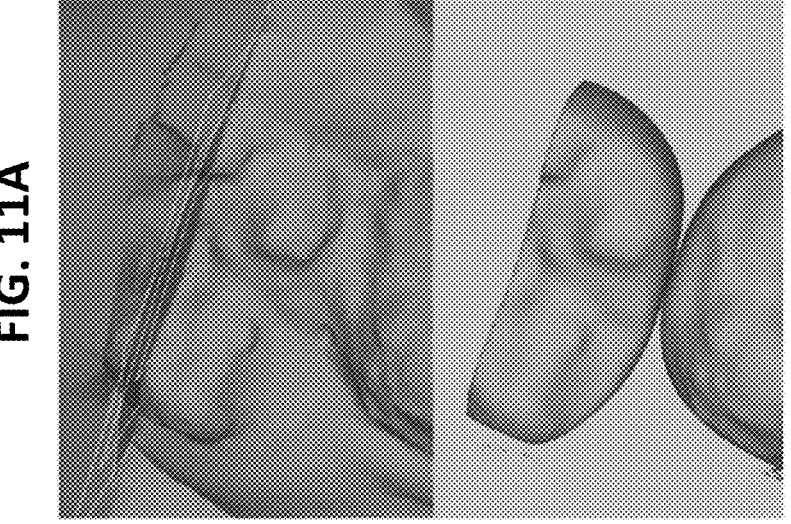
FIG. 11A
FIG. 11B

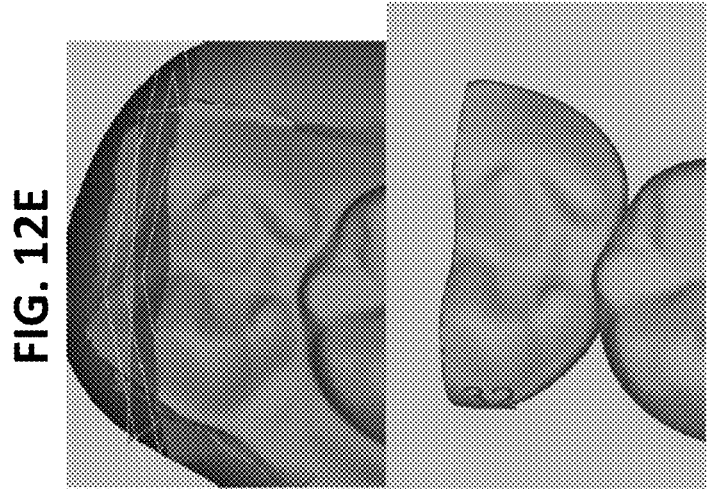
FIG. 12E
FIG. 12F
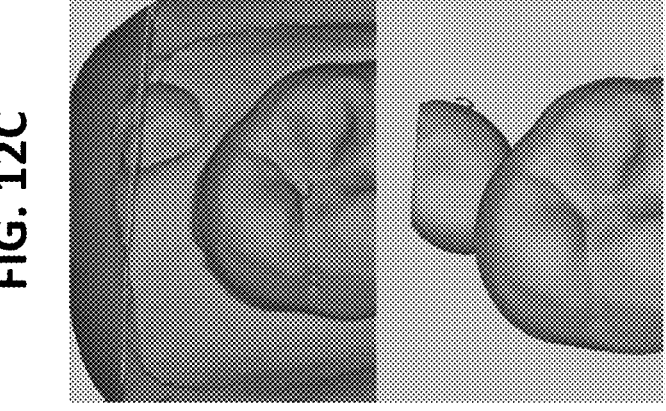
FIG. 12C
FIG. 12D
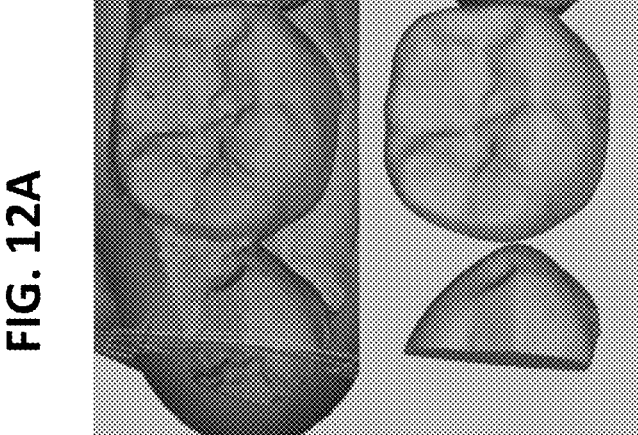
FIG. 12A
FIG. 12B

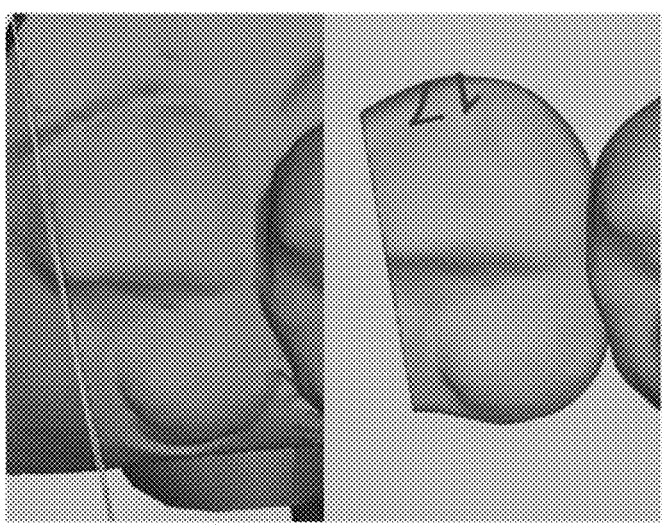
FIG. 13E
FIG. 13F
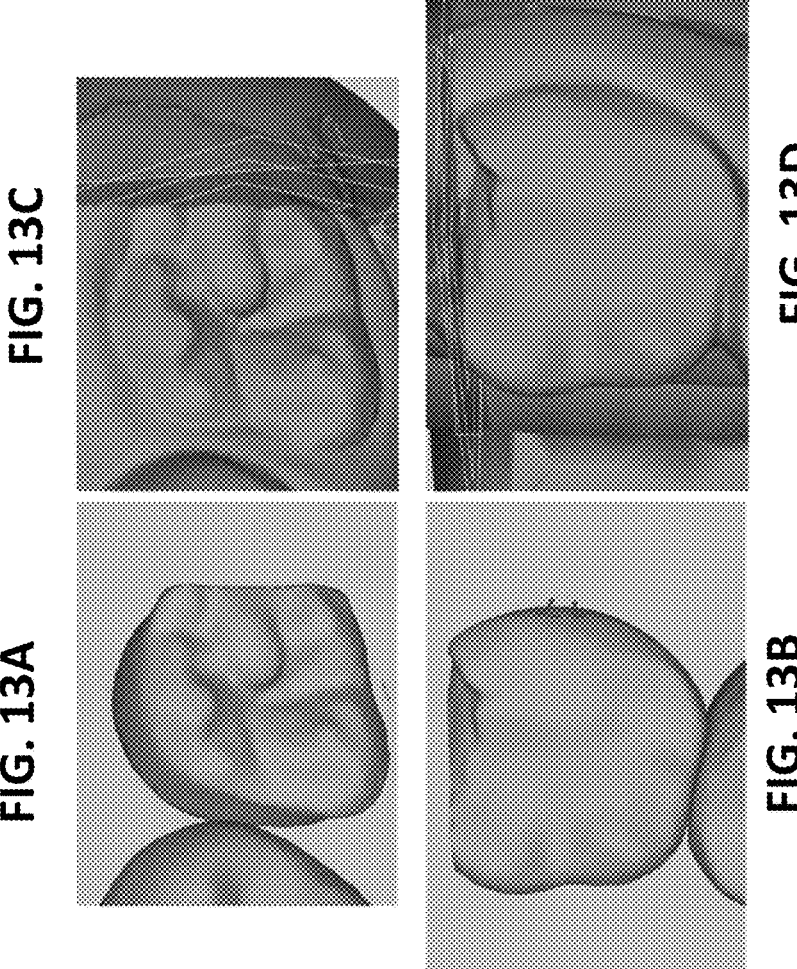
FIG. 13C
FIG. 13D
FIG. 13A
FIG. 13B

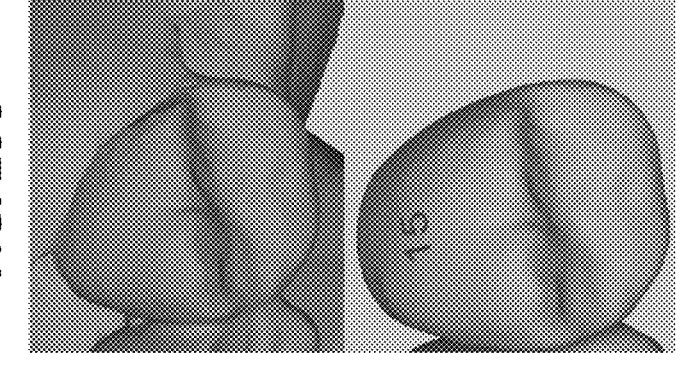
FIG. 20C
FIG. 20D
FIG. 20A
FIG. 20B
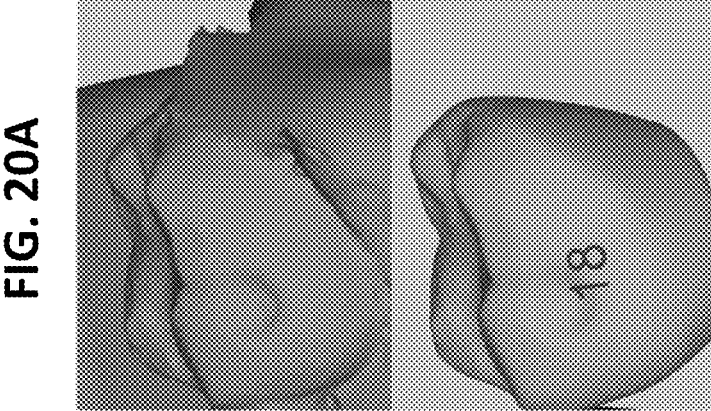
FIG. 20F
FIG. 20E

FIG. 24D
FIG. 24C
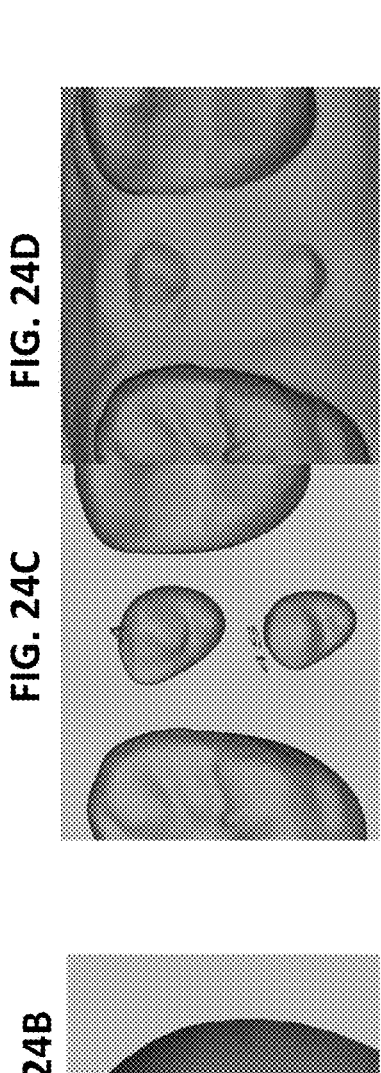
FIG. 25E
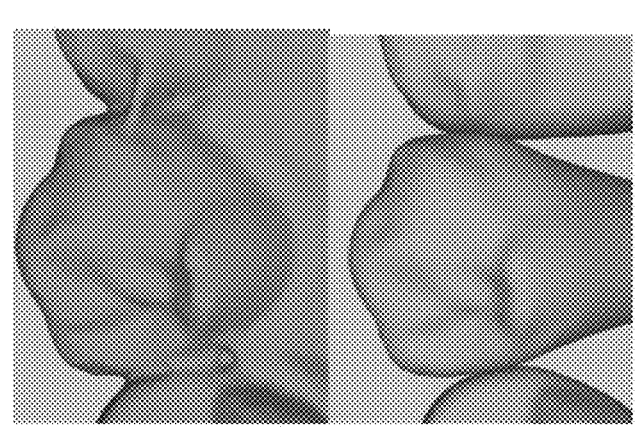
FIG. 25F
FIG. 24B
FIG. 24A
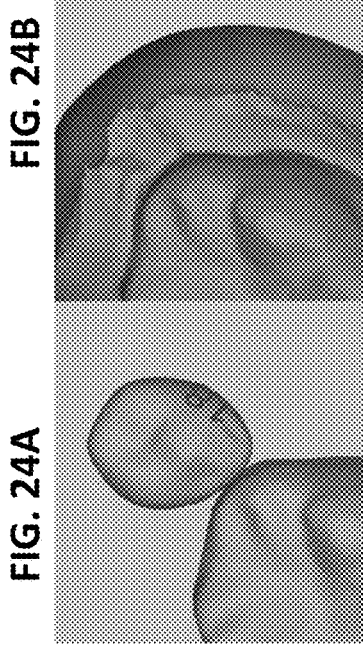
FIG. 25C
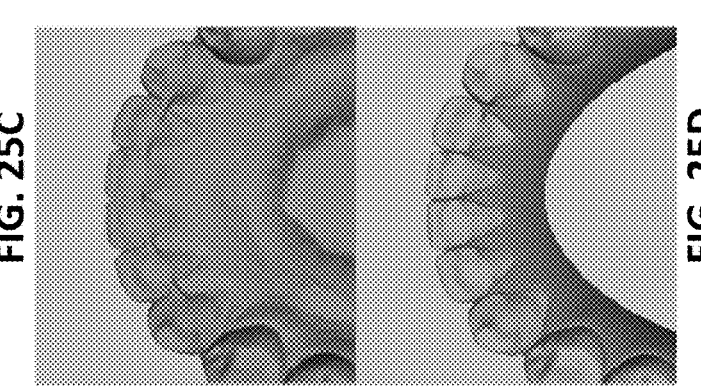
FIG. 25D
FIG. 25A
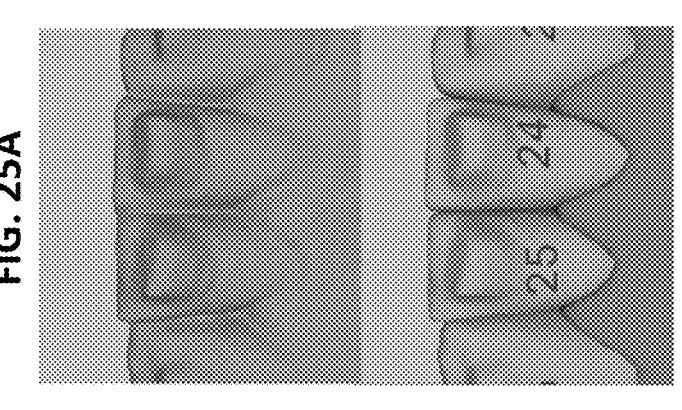
FIG. 25B

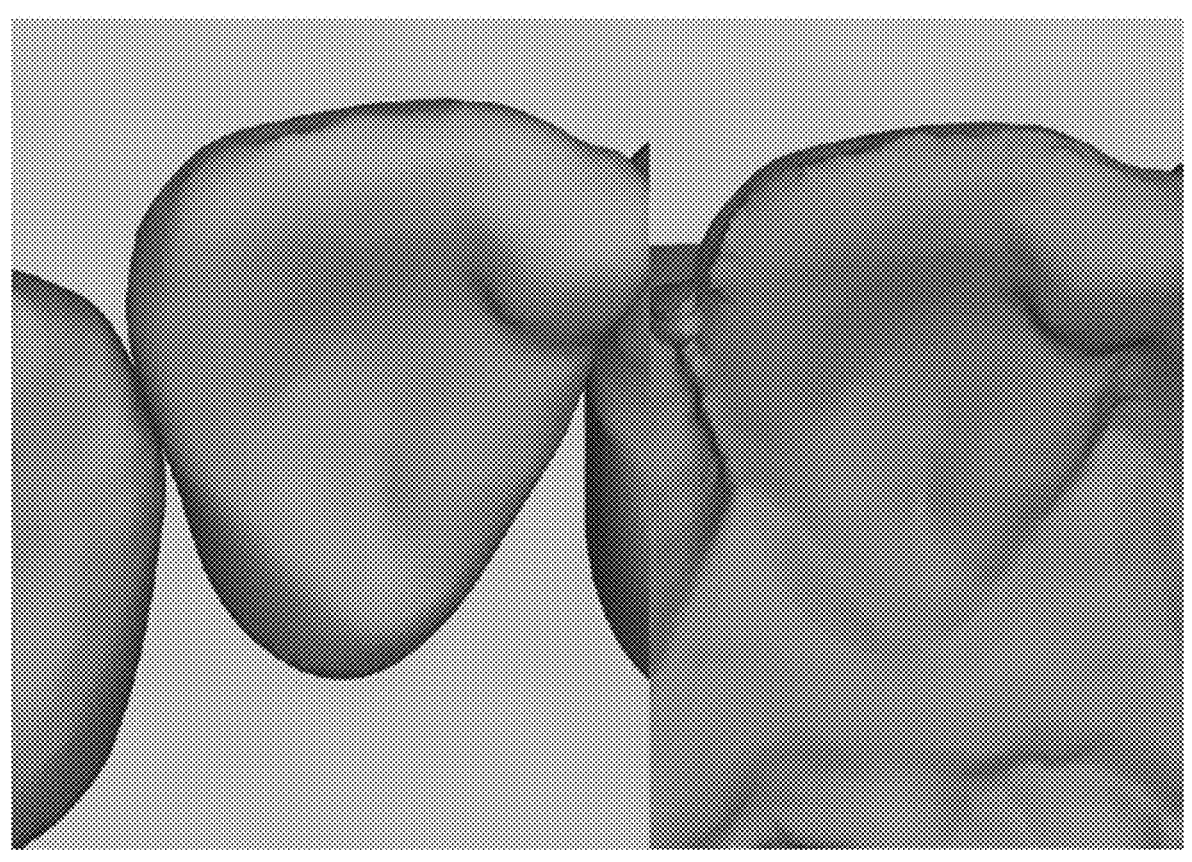
FIG. 26A                    FIG. 26B

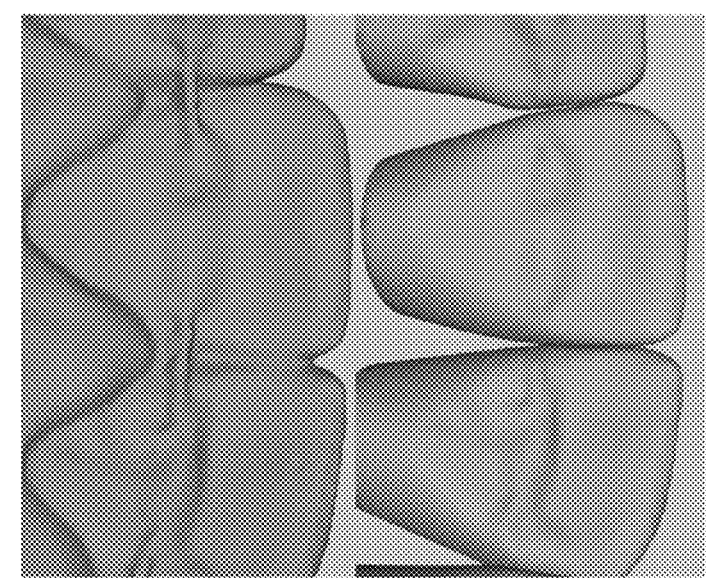
FIG. 27E
FIG. 27F
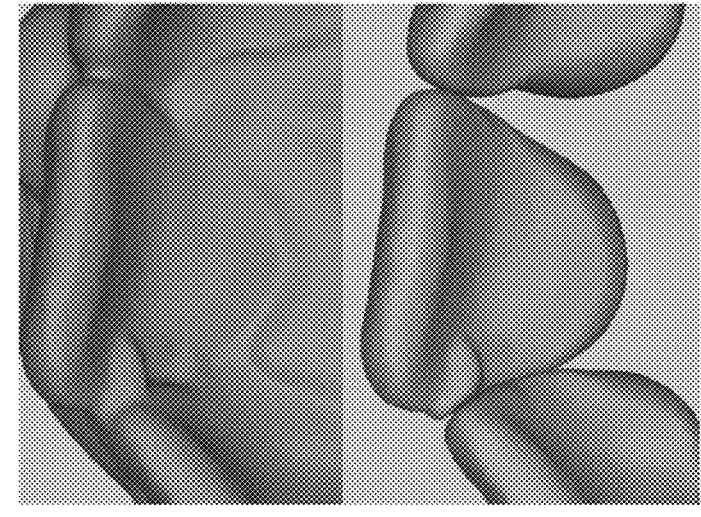
FIG. 27C
FIG. 27D
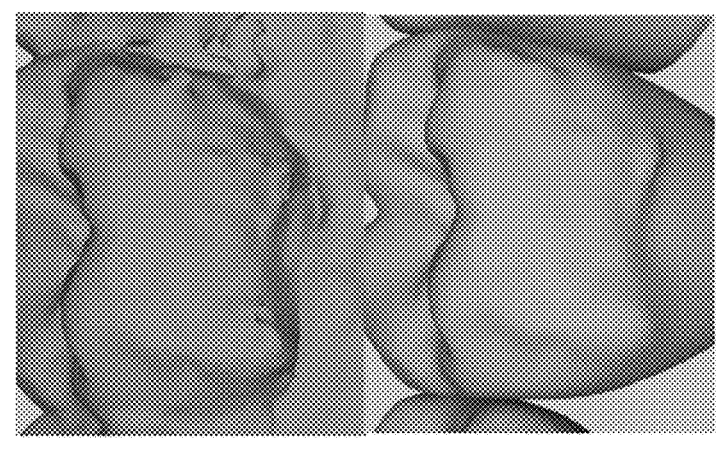
FIG. 27A
FIG. 27B

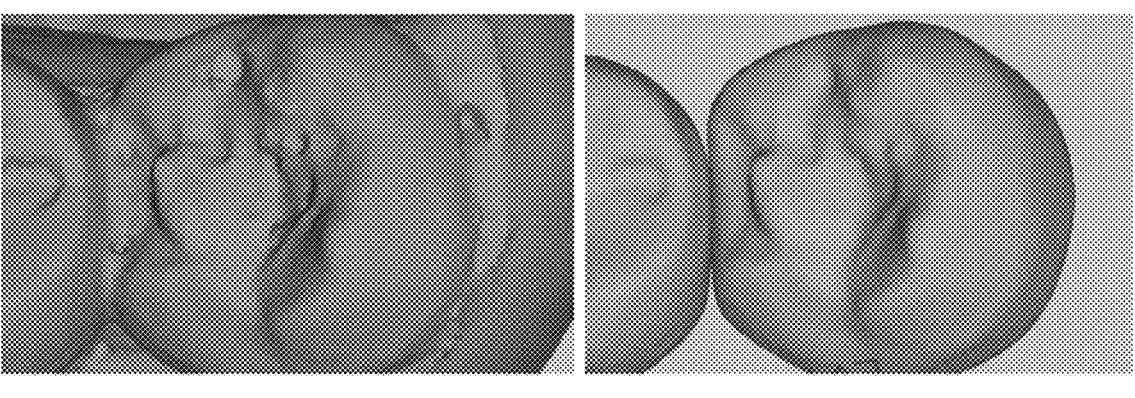
FIG. 28A          FIG. 28B
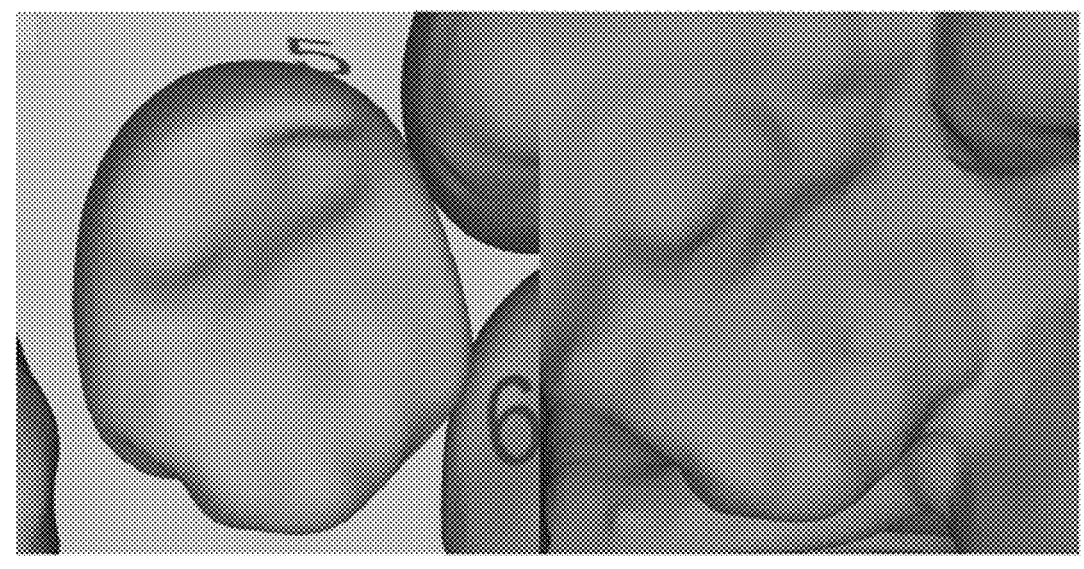
FIG. 28C          FIG. 28D

FIG. 29A                         FIG. 29B

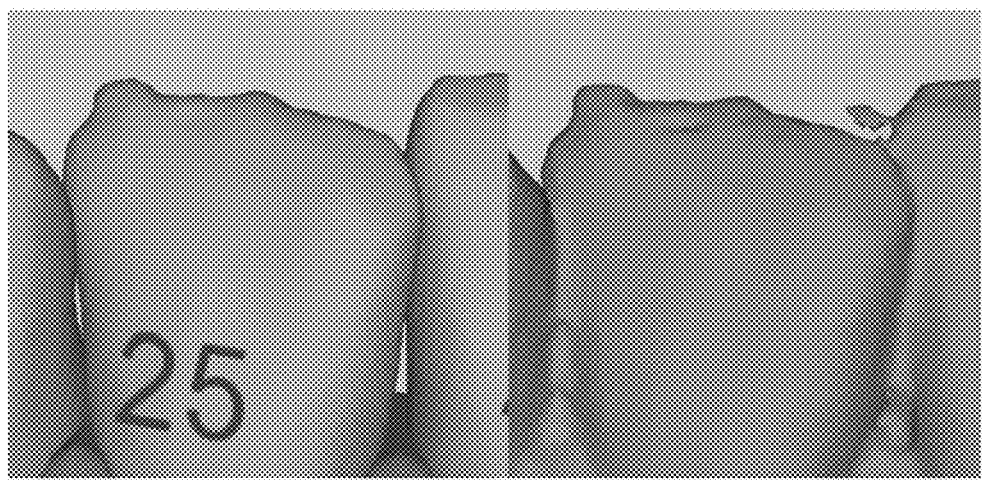
FIG. 30A                                    FIG. 30B
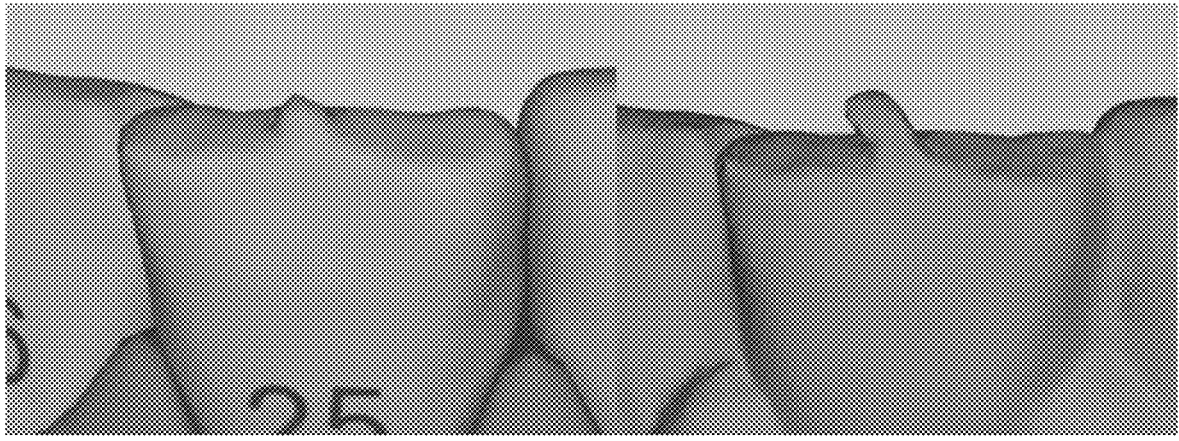
FIG. 30C                                    FIG. 30D

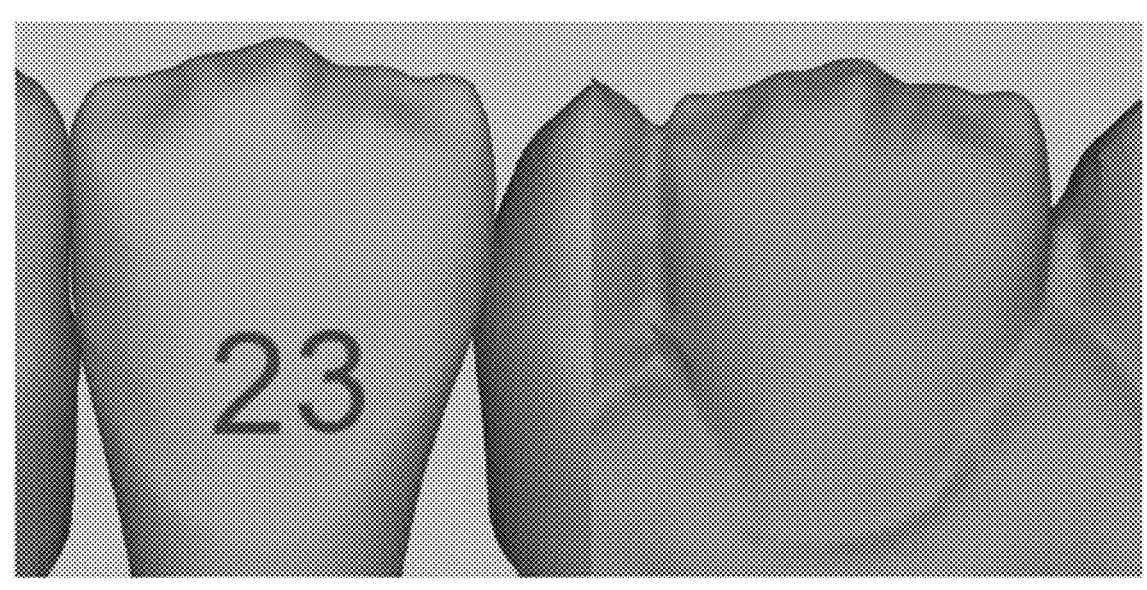
FIG. 31A                    FIG. 31B
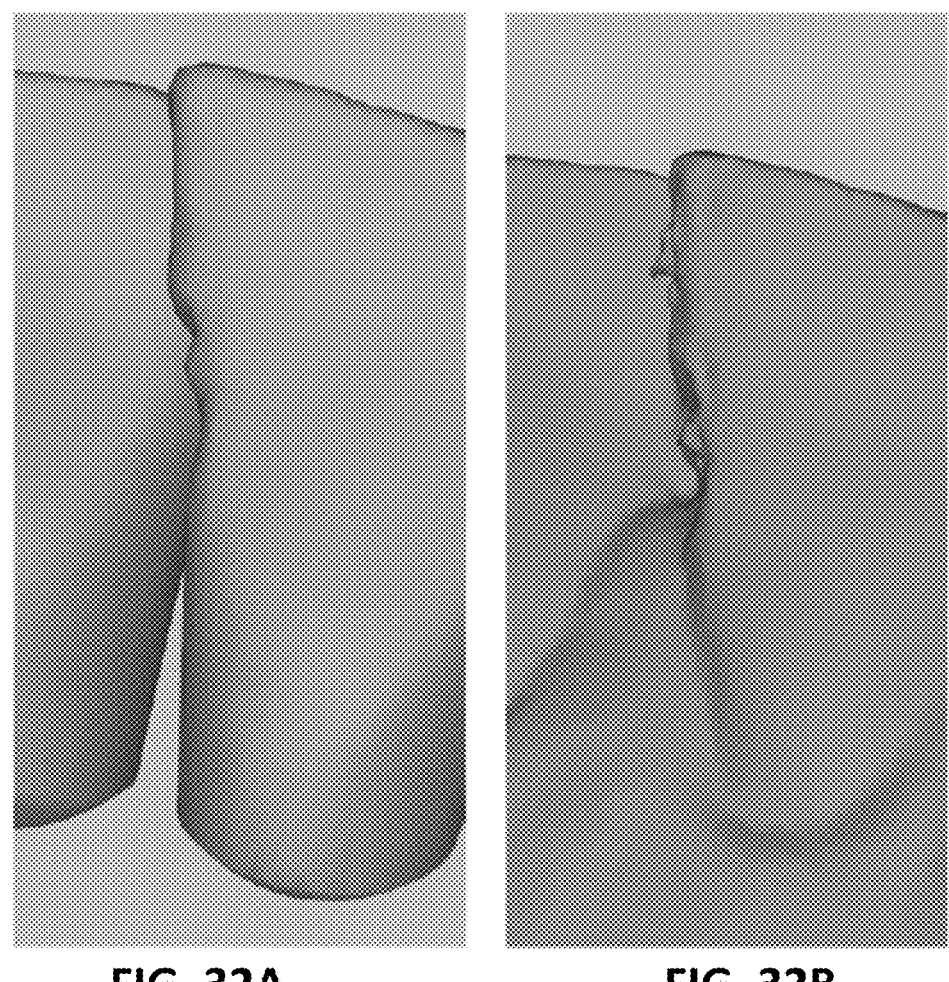
FIG. 32A                    FIG. 32B

FIG. 32G     FIG. 32H

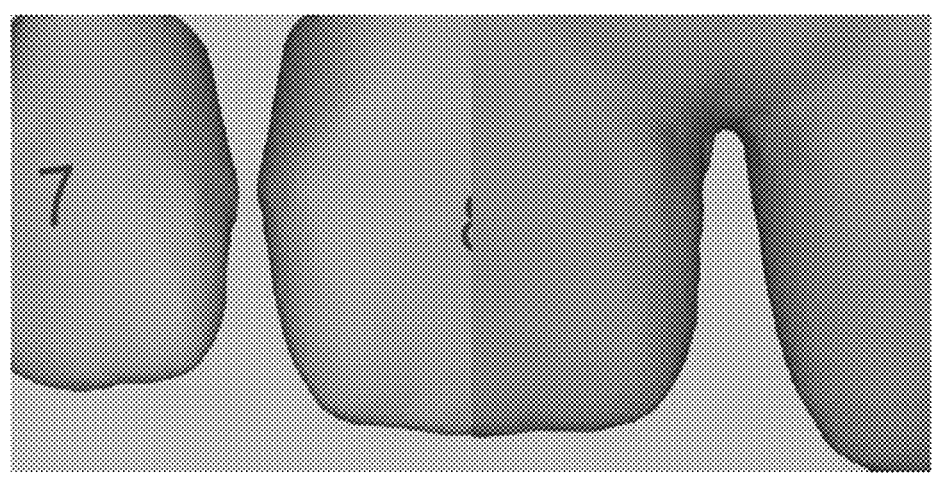
FIG. 33A          FIG. 33B
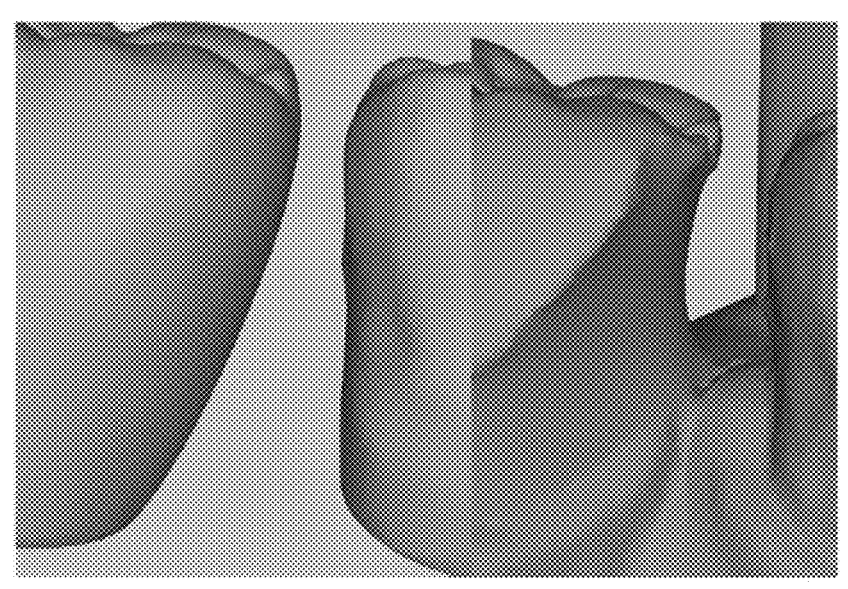
FIG. 33C          FIG. 33D

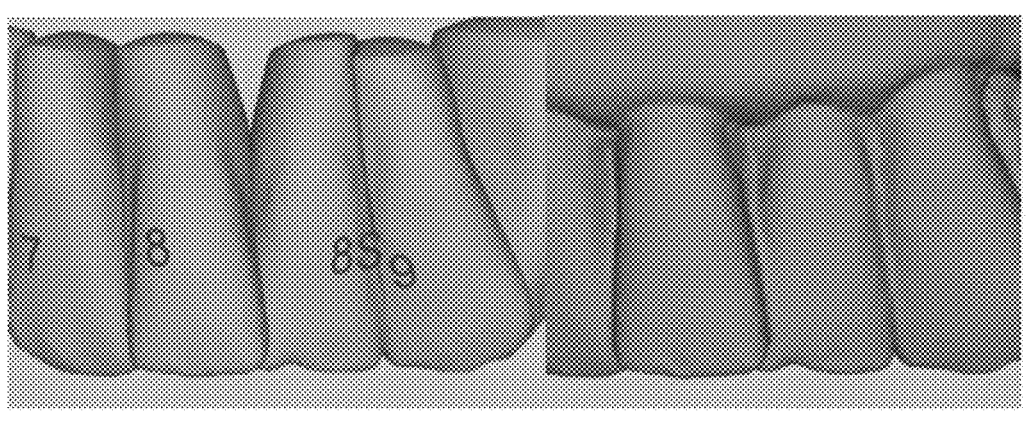
FIG. 34A          FIG. 34B
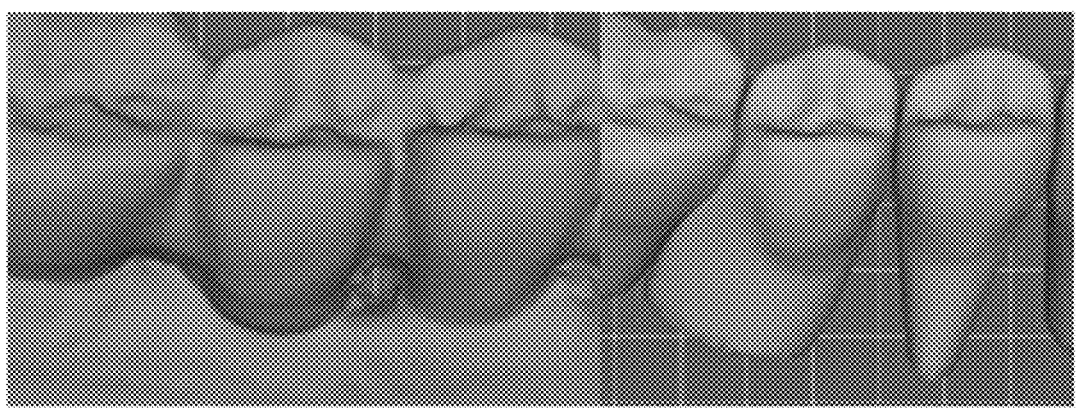
FIG. 34C          FIG. 34D

FIG. 35A
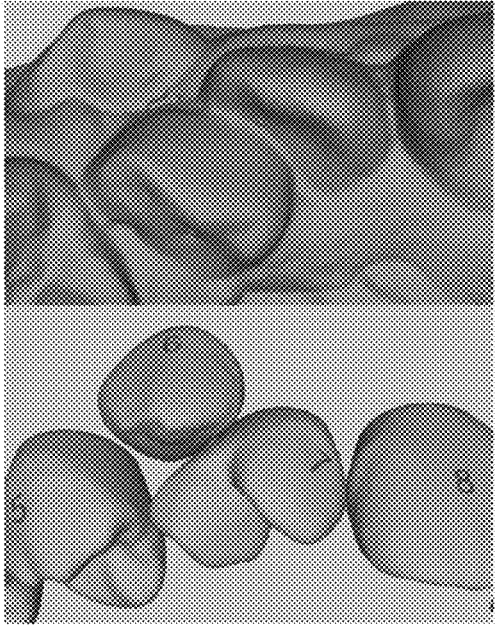
FIG. 35B
FIG. 35E
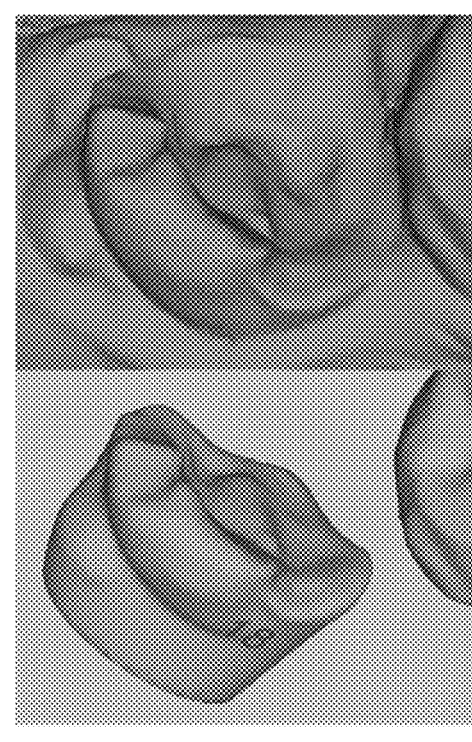
FIG. 35F
FIG. 35C
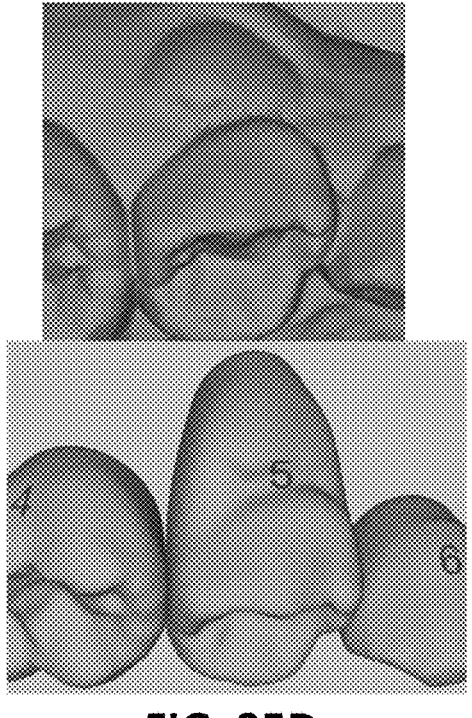
FIG. 35D
FIG. 35G

3700

THREE-DIMENSIONAL DENTAL MODEL SEGMENTATION QUALITY ASSESSMENT

CROSS REFERENCE TO RELATED APPLICATIONS

This patent application claims priority to U.S. Provisional Patent Application No. 63/481,797, titled "THREE-DIMENSIONAL DENTAL MODEL SEGMENTATION QUALITY ASSESSMENT" filed on Jan. 26, 2023, and is herein incorporated by reference in its entirety.

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

Orthodontic procedures typically involve repositioning a subject's teeth to a desired arrangement in order to correct malocclusions and/or improve aesthetics. To achieve these objectives, orthodontic appliances such as braces, shell aligners, and the like can be applied to the subject's teeth by an orthodontic practitioner and/or by the subjects themselves. The appliance can be configured to exert force on one or more teeth in order to effect desired tooth movements according to a treatment plan.

Orthodontic aligners may include devices that are removable and/or replaceable over the teeth. Orthodontic aligners may be provided as part of an orthodontic treatment plan. In some orthodontic treatment plans involving removable and/or replaceable aligners, a subject may be provided plurality of orthodontic aligners over the course of treatment to make incremental position adjustments to the subject's teeth. An orthodontic aligner may have a polymeric trough with an inner cavity shaped to receive and resiliently reposition teeth from one tooth arrangement to a successive tooth arrangement. Orthodontic aligners may include "active" regions that impose repositioning forces on teeth and "passive" regions that retain teeth in their current state.

Some orthodontic aligners make use of a 3D model of the patient's teeth for treatment planning and tracking. The 3D modeling process can include scanning the patient's teeth with an intraoral scanner, generating a 3D model from the scanned data, and segmenting the 3D model to identify individual teeth and/or other intraoral features such as gingiva. Segmentation of 3D models is a complex computational process which can include separating teeth anatomy from gingiva and removing extra material and distortions from the scan. The result of the segmentation significantly affects treatment quality, and poor segmentation results can cause aligner fit issues, pain, and other customer complaints. To improve segmentation outcomes, automatically segmented scans can be manually reviewed and corrected by dedicated person, such as a DDT CAD designer, who can spend time to review and correct segmented dental models, further adding time and expense to orthodontic treatments. After the manual review, the segmented 3D dental model may be used to prepare all or part of a dental or orthodontic treatment plan.

There is a need for accurate, automated review of the segmentation of scans of patients to thereby reduce the time associated with the development of treatment plans.

SUMMARY OF THE DISCLOSURE

The methods and apparatuses (e.g., devices and systems, including software, firmware and/or hardware) described herein address the need to provide an efficient, rapid and highly accurate review of three-dimensional (3D) dental models generated from dental scans. Some 3D dental models may be suitable for use in determining a dental treatment plan. However, some other 3D dental models may include errors that could cause problems or introduce errors in a dental treatment plan. The present application addresses these and other technical problems by providing technical solutions and/or automated agents that automatically review trimmed segmented 3D dental models.

In general, example apparatuses (e.g., devices, systems, etc.) and/or methods described herein may acquire a 3D dental model of a subject's teeth. The 3D dental model may be segmented 3D dental model of the subject's teeth. As used herein, a subject may be a patient with or without a diagnosed ailment (e.g., an orthodontic patient, a dental patient, etc.). The methods and apparatuses (e.g., systems) described herein may be used for developing or refining a treatment plan for a subject (e.g., a patient). In some implementations, the 3D dental model may be automatically segmented by a computing environment, one or more processors, a cloud-based processing apparatus, any feasible processing system or the like configured to receive a 3D dental model and identify and/or separate dental anatomies from within the 3D dental model.

In some examples, the segmented 3D dental model may provide the basis for implementation of automated orthodontic treatment plans, design and/or manufacture of orthodontic appliances (including, but not limited to, orthodontic aligners and/or a series of polymeric orthodontic aligners that provide forces to correct malocclusions in a subject's teeth). The apparatuses and/or methods described herein may provide instructions to generate a set or series of aligners, and/or orthodontic treatment plans using orthodontic appliances.

For example, described herein are methods comprising: receiving a segmented three-dimensional (3D) dental model of a subject's dentition, classifying the segmented 3D dental model using one or more trained machine learning classifier engines, wherein the one or more machine learning classifier engines are trained on one or more of: trimming plane errors, scan artifact, extra teeth, and missing teeth, and passing the segmented 3D dental model to a treatment planning engine based on the classification, otherwise re-segmenting the 3D dental model.

In general the trained machine learning agents described herein may be a trained pattern matching agent of any type, including, but not limited to, an artificial intelligence agent and/or a machine learning agent. The machine learning agent may be a deep learning agent. In some examples, the trained pattern matching agent may be trained neural network. Any appropriate type of neural network may be used, including generative neural networks. The neural network may be one or more of: perceptron, feed forward neural network, multilayer perceptron, convolutional neural network, radial basis functional neural network, recurrent neural network, long short-term memory (LSTM), sequence to sequence model, modular neural network, etc. In some examples a trained pattern matching agent may be trained using a training data set.

Any of these methods may further include receiving an age classification of the subject, wherein classifying the segmented 3D dental model is based on the age classification. Example age classifications may include adult, teen, child, and/or infant age classifications or categories.

In general, any of these methods may also include receiving scan data of the subject's dentition. Scan data may include any feasible scan data including from cameras, intraoral scanners, x-ray devices, infrared devices, or the like from which 3D dental models may be constructed, generated, determined, or the like.

In some examples, the methods may include classifying the segmented 3D dental model may include using one or more trained machine learning classifier engines trained on: trimming plane errors, scan artifact, extra teeth, and missing teeth.

In general, classifying the segmented 3D dental model may include using one or more trained machine learning classifier engines trained on: trimming plane errors, scan artifact, extra teeth, and missing teeth.

In any of the methods described herein, the one or more machine learning classifier engines may be trained using a training database that includes automatically segmented 3D dental models, corresponding scan data, and age classification scored for one or more of: trimming plane errors, scan artifacts, extra teeth, and missing teeth.

In general, in any of the methods described herein trimming plane errors may include one or more of: missing and/or incorrectly placed trimming planes, and non-terminal teeth trimmed.

In some examples, the scan artifacts described herein may include one or more of: excess or absence of non-dental anatomic material, interproximal (IP) material bridging between teeth or teeth and gingiva, and orthodontic appliance material on the teeth.

In any of these methods, the missing teeth may include erupting or partially erupted teeth. Furthermore, in any of these methods, extra teeth may include at least one tooth segmented as multiple teeth.

In general, any of the methods described herein may also include forming a dental appliance from a treatment plan generated by the treatment planning engine.

In any of these methods, classifying the segmented 3D dental model using one or more trained machine learning classifier engines may include classifying using a first machine learning classifier engine trained on trimming plane errors, and a second machine learning classifier engine trained on: scan artifact, extra teeth, and missing teeth.

Furthermore, in any of the methods described herein, receiving the segmented 3D dental model may include receiving an automatically segmented 3D dental model.

Also described herein are methods that may include receiving a segmented three-dimensional (3D) dental model of a subject's dentition, a scan data of the subject's dentition, and an age classification of the subject, classifying the segmented 3D dental model using one or more trained machine learning classifier engines, wherein the one or more machine learning classifier engines are trained using a training database comprising automatically segmented 3D dental models, corresponding scan data, and age classification scored for and one or more of: missing or incorrectly placed trimming planes, excess or absence of non-dental anatomic material, extra teeth, and missing teeth, and passing the segmented 3D model to a treatment planning engine based on the classification, otherwise re-segmenting the 3D dental model.

Described herein are non-transitory computer-readable storage medium storing instructions that, when executed by one or more processors, cause the one or more processor to perform a method comprising receiving a segmented three-dimensional (3D) dental model of a subject's dentition, classifying the segmented 3D dental model using one or more trained machine learning classifier engines, wherein the one or more machine learning classifier engines are trained on one or more of: trimming plane errors, scan artifact, extra teeth, and missing teeth, and passing the segmented 3D model to a treatment planning engine based on the classification, otherwise re-segmenting the 3D dental model.

As used herein, a processor may include hardware that runs the computer program code. Specifically, the term 'processor' may include a controller and may encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. The processors described herein may be part of a controller. A controller may include one or more processors.

In any of the stored instructions, receiving a segmented 3D dental model may include receiving an age classification of the subject. In some examples, the age classification may include adult, teen, and/or child classifications.

In general, any of stored instructions may also include instructions for receiving scan data of the subject's dentition. Scan data may include any feasible scan data including from cameras, intraoral scanners, x-ray devices, infrared devices, or the like from which 3D dental models may be constructed, generated, determined, or the like.

In any of the stored instructions, classifying the segmented 3D dental model may include using one or more trained machine learning classifier engines trained on: trimming plane errors, scan artifact, extra teeth, and missing teeth.

In some examples, the stored instructions may cause one or more processors to classify the segmented 3D dental model with one or more machine learning classifier engines trained using a training database comprising automatically segmented 3D dental models, corresponding scan data, and age classification scored for and one or more of: trimming plane errors, scan artifact, extra teeth, and missing teeth.

In general, trimming plane errors described herein may include one or more of missing and/or incorrectly placed trimming planes, and non-terminal teeth trimmed.

In any of the stored instructions, scan artifacts may include one or more of: excess or absence of non-dental anatomic material, interproximal (IP) material bridging between teeth or teeth and gingiva, and orthodontic appliance material on the teeth.

In general, the missing teeth may include erupting or partially erupted teeth. In some variations, the extra teeth may include at least one tooth segmented as multiple teeth.

In any of the stored instructions, classifying the segmented 3D dental model may include using one or more trained machine learning classifier engines comprises classifying using a first machine learning classifier engine trained on trimming plane errors, and a second machine learning classifier engine trained on: scan artifact, extra teeth, and missing teeth.

In any of the stored instructions, receiving the segmented 3D dental model may include receiving an automatically segmented 3D dental model.

Also described herein are non-transitory computer-readable storage medium storing instructions that, when executed by one or more processors, cause the one or more processor to perform a method including receiving a segmented three-dimensional (3D) dental model of a subject's dentition, a scan data of the subject's dentition, and an age classification of the subject, classifying the segmented 3D dental model using one or more trained machine learning classifier engines, wherein the one or more machine learning classifier engines are trained using a training database comprising automatically segmented 3D dental models, corresponding scan data, and age classification scored for and one or more of: missing or incorrectly placed trimming planes, excess or absence of non-dental anatomic material, extra teeth, and missing teeth, and passing the segmented 3D model to a treatment planning engine based on the classification, otherwise re-segmenting the 3D dental model.

All of the methods and apparatuses described herein, in any combination, are herein contemplated and can be used to achieve the benefits as described herein.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 3 shows a flowchart showing another example method for classifying a segmented 3D dental model.

FIG. 4 shows a flowchart showing an example method for training a machine learning classifier engine.

FIGS. 9A-35G show trimmed segmented 3D dental models that may be used as training images.

FIGS. 9A-9C shows examples of images of trimming planes in 3D models of a patient's teeth that may be used for training a neural network as described herein, showing trimming that is incorrect.

FIGS. 10A-10K shows examples of images of trimming planes in 3D models of a patient's teeth (e.g., molars) that may be used for training a neural network as described herein, showing trimming that is correct.

FIGS. 11A-11D shows examples of images trimmed 3D models of a patient's teeth that may be used for training a neural network as described herein, showing trimming that is incorrect.

FIGS. 12A-12F shows examples of images of trimmed 3D models of a patient's teeth that may be used for training a neural network as described herein, showing trimming that is incorrect.

FIGS. 13A-13F shows examples of images of trimmed 3D models of a patient's teeth having unusual anatomy that may be used for training a neural network as described herein, showing trimming that is incorrect.

FIGS. 20A-20F shows examples of images of trimmed 3D models of a patient's teeth that may be used for training a neural network.

FIGS. 24A-24D shows examples of images of trimmed 3D models of a patient's teeth including erupting or partially erupting teeth for teen subjects that may be used for training a neural network.

FIGS. 25A-25F shows examples of images of trimmed 3D models of a patient's teeth that include dental appliances that are incorrectly included as part of the subject's dentition and that may be used for training a neural network.

FIGS. 26A-26B shows examples of images of trimmed 3D models of a patient's teeth that show excess (or show an absence) of material that does not match with actual anatomy and may be used for training a neural network.

FIGS. 27A-27F shows examples of images of trimmed 3D models of a patient's teeth having unusual anatomy and that may be used for training a neural network.

FIGS. 28A-28D shows examples of images of trimmed 3D models of a patient's teeth having unusual anatomy and that may be used for training a neural network.

FIGS. 29A-29D shows examples of images of trimmed 3D models of a patient's teeth having unusual anatomy and that may be used for training a neural network.

FIGS. 30A-30D shows examples of images of trimmed 3D models of a patient's teeth having unusual anatomy and that may be used for training a neural network.

FIGS. 31A-31B shows examples of images of trimmed 3D models of a patient's teeth having unusual anatomy associated with an incisal surface and that may be used for training a neural network.

FIGS. 32A-32J shows examples of images of trimmed 3D models of a patient's teeth with unusual anatomies concerning interproximal spaces and that may be used for training a neural network.

FIGS. 33A-33D shows examples of images of trimmed 3D models of a patient's teeth having unusual interproximal space and that may be used for training a neural network.

FIGS. 34A-34D shows examples of images of trimmed 3D models of a patient's teeth that includes incorrect root surfaces and that may be used for training a neural network.

FIGS. 35A-35G shows examples of images of trimmed 3D models of a patient's teeth that includes incorrect teeth and that may be used for training a neural network.

DETAILED DESCRIPTION

Figure 1A:
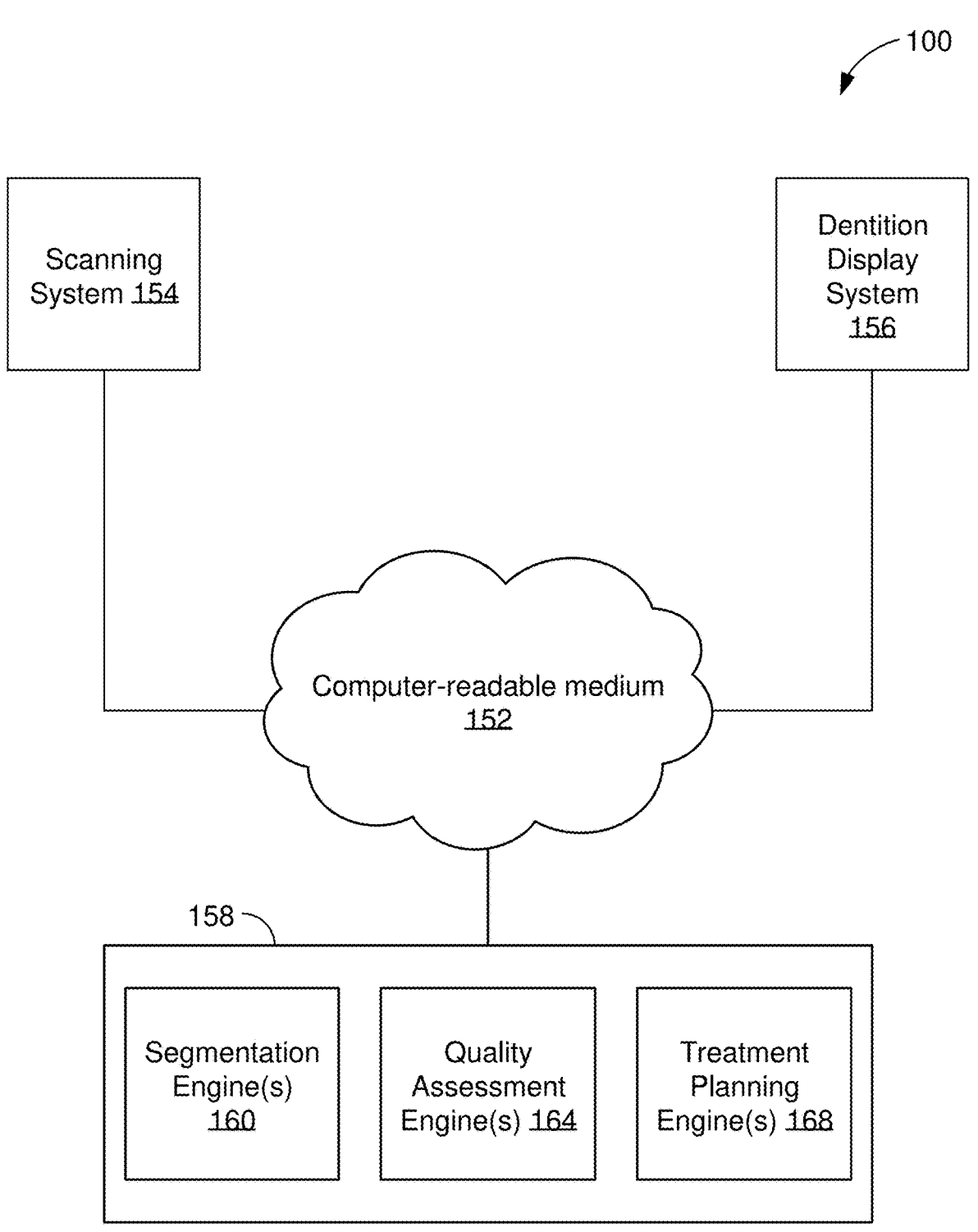
FIG. 1A is a diagram showing an example of a computing environment configured to facilitate gathering and processing digital scans of a dental arch with teeth therein.

Described herein are apparatuses (e.g., systems, computing device readable media, devices, etc.) and methods for improving automated segmentation outcomes of three-dimensional (3D) dental models.

The apparatuses and/or methods described herein may be useful in planning and fabrication of dental appliances, including elastic polymeric positioning appliances, is described in detail in U.S. Pat. No. 5,975,893, and in published PCT application WO 98/58596, which is herein incorporated by reference for all purposes. Systems of dental appliances employing technology described in U.S. Pat. No. 5,975,893 are commercially available from Align Technology, Inc., San Jose, Calif., under the tradename, Invisalign System.

Throughout the body of the Description of Embodiments, the use of the terms "orthodontic aligner", "aligner", or "dental aligner" is synonymous with the use of the terms "appliance" and "dental appliance" in terms of dental applications. For purposes of clarity, embodiments are hereinafter described within the context of the use and application of appliances, and more specifically "dental appliances."

A "subject," as used herein, may be any subject (e.g., human, non-human, adult, child, etc.) and may be alternatively and equivalently referred to herein as a "patient", a "patient under treatment", or a "subject." A "patient," as used herein, may but need not be a medical patient. An "subject" or a "patient," as used herein, may include a person who receives orthodontic treatment, including orthodontic treatment with a series of orthodontic aligners.

As described herein, any of a variety of tools can be used to convert a "real world" representation of a patient's dentition into a virtual model. For example, an image (e.g., picture or scan) of the dentition can be converted to a 2D or 3D model (e.g., 2D or 3D mesh). In some cases, a number of images are combined to create a single model. In some examples, an intraoral scanner generates multiple different images of a dental site, model of a dental site, or other object. The images may be discrete images (e.g., point-andshoot images) or frames from a video (e.g., a continuous scan). The intraoral scanner may automatically generate a 3D model of the patient's teeth. In some cases, the 3D model includes the digital detailing and cut and detail processes during which a 3D mesh is converted into a CAD model with labeled teeth. A 3D dental mesh or model may include any feasible model, wireframe, and/or surface that describes or includes dimension information related to any feasible object or anatomy.

In a number of systems, a digital representation of a dental arch is partitioned into constituent parts, including teeth. This process is sometimes referred to segmentation or auto-segmentation. The teeth are then identified and numbered according to their dental tooth type. The tooth numbering may be used to create a treatment plan for correcting teeth locations. The process for both 2D images and 3D models or meshes generally begins by identifying which objects in the representation correspond to the central incisors and then working distally to identify the tooth number corresponding to the other objects. This process may cause errors in numbering if there are missing teeth and/or supernumerary teeth. For example, if a patient is missing their first premolars, then the system may mislabel the second premolars as first premolars and the first molars as second premolars. This is particularly likely when the patient's teeth differ from the norm. Thus during segmentation or auto-segmentation marked, the 2D images or 3D models/meshes may be labeled, divided, etc., to indicate different regions of the dentition, including individual teeth or regions of teeth (e.g., crown, root, etc.), gingiva, non-tooth regions (e.g., brackets, attachments, etc.). In some cases, regions or teeth may be labeled on the 3D models/meshes or in a separate index (e.g., file, database, etc.) referencing the 3D model/mesh. In some examples may divide the 2D images or 3D models into different sub-models. Auto-segmentation may refer to 3D models that are segmented using an automatic segmentation engine (e.g., module, subsystem, etc.) such as that described in detail in U.S. patent application Ser. No. 17/534,420, and in published PCT application WO 2022/109500, which is herein incorporated by reference for all purposes.

As described herein, an intraoral scanner may image a subject's dental arch and generate a virtual three-dimensional model of that dental arch. During an intraoral scan procedure (also referred to as a scan session), a user (e.g., a dental practitioner) of an intraoral scanner may generate multiple different images (also referred to as scans or medical images) of a dental site, model of a dental site, or other object. The images may be discrete images (e.g., point-and-shoot images) or frames from a video (e.g., a continuous scan).

An age classification, as used herein, may be used to describe a general range of ages of a subject. The age classifications may generally be associated with dental anatomies that are consistent with different developmental stages of subjects. Example age classifications may include child, teen, and adult.

As used herein, classifying may refer to the manual (e.g., performed by a technician, clinician, or the like) or automatic (e.g., performed by an apparatus, machine, processor, or the like) of ranking, scoring, grading, etc. of an image or model, including 3D dental models. The classifying may be qualitative (e.g., classified with a pass/fail or other qualitative value) and/or quantitative (e.g., classified with a numeric or alphanumeric score).

Machine learning (ML) classifier engines may include any apparatus, software or hardware module, processor, firmware, or the that can provide or associate a classification to any feasible input, including any feasible 3D dental model. In some examples, ML classifier engines may include one or more processors executing one or more trained neural networks.

ML classifier engines may be trained ("trained on") using one or more databases. The databases, sometimes referred to as training databases, may include labeled segmented 3D dental images and/or original scan data (e.g., scan images) from patient teeth. In some examples, scan data of the patient's dentition may be provided by an intraoral scanner data. Scan data may include with visible light, florescent light, infrared (IR) light or near-IR light images The database labels may indicate a pass or fail condition or classification. A pass indicates that the segmented 3D dental model may be used to determine a dental treatment plan whereas a fail indicates that the segmented 3D dental model may include errors and therefore should not be used to determine a dental treatment plane. Training of a ML classifier engine may include using a training database specifically labeled (e.g., enriched, etc.) on one or more categories of specific types of segmentation errors, which may include: trimming errors (e.g., trimming plane errors such as missing and/or incorrectly placed trimming planes, non-terminal teeth trimmed), scan artifacts (e.g., excess or absence of non-dental anatomic material, interproximal (IP) material bridging between teeth or teeth and gingiva, orthodontic appliance material present—such as wires, brackets, attachments, etc.) (may be on occlusal surface, incisal, buccal/lingual), missing tooth (erupting, partially erupted teeth), and/or extra teeth (e.g., one tooth segmented as multiple teeth). Trimming may refer to processing operations performed on a 3D dental model to "trim" or separate teeth or other indicated or selected objects from the 3D dental model. Trimming error may cause or introduce errors into the segmented 3D dental model. Training of the ML classifier engines may include the use or incorporation of age classification since the significance of errors in segmentation may be specific to an age category (teen vs. adult, particularly with erupting/unerupted teeth). Note that training of ML classifier engines may include an indicator of the degree (high, medium, low, etc.) of the segmentation error; in some case the degree may be specific to the age classification (e.g., the same error may have a different degree based on the age classification).

FIG. 1A is a diagram showing an example of a computing environment 100 configured to facilitate gathering and processing digital scans of a dental arch with teeth therein. The environment 100 includes a computer-readable medium 152, a scanning system 154, a dentition display system 156, and a segmentation and assessment system 158. One or more of the modules in the computing environment 100 may be coupled to one another or to modules not explicitly shown.

The computer-readable medium 152 and other computer readable media discussed herein are intended to represent a variety of potentially applicable technologies. For example, the computer-readable medium 152 can be used to form a network or part of a network. Where two components are co-located on a device, the computer-readable medium 152 can include a bus or other data conduit or plane. Where a first component is co-located on one device and a second component is located on a different device, the computer-readable medium 152 can include a wireless or wired back-end network or LAN. The computer-readable medium 152 can also encompass a relevant portion of a WAN or other network, if applicable.

The scanning system 154 may include a computer system configured to scan a subject's dental arch. A "dental arch,"

as used herein, may include at least a portion of a subject's dentition formed by the subject's maxillary and/or mandibular teeth, when viewed from an occlusal perspective. The dental arch may include one or more maxillary or mandibular teeth of a subject, such as all teeth on the maxilla or mandible or a subject. The scanning system 154 may include memory, one or more processors, and/or sensors to detect contours on a subject's dental arch. The scanning system 154 may be implemented as a camera, an intraoral scanner, an x-ray device, an infrared device, etc. In some implementations, the scanning system 154 is configured to produce 3D scans or models (e.g., 3D dental models) of the subject's dentition. In other implementations the scanning system 154 is configured to produce 2D scans or images of the subject's dentition. The scanning system 154 may include a system configured to provide a virtual representation of a physical mold of patient's dental arch. The scanning system 154 may be used as part of an orthodontic or dental treatment plan. In some implementations, the scanning system 154 is configured to capture a subject's dental arch at a beginning stage, an intermediate stage, etc. of an orthodontic treatment plan.

The dentition display system 156 may include a computer system configured to display at least a portion of a dentition of a subject. The dentition display system 154 may include memory, one or more processors, and a display device to display the subject's dentition. The dentition display system 156 may be implemented as part of a computer system, a display of a dedicated intraoral scanner, etc. In some implementations, the dentition display system 156 facilitates display of a subject's dentition using scans that are taken at an earlier date and/or at a remote location. The dentition display system 156 may facilitate display of scans taken contemporaneously and/or locally. As noted herein, the dentition display system 156 may be configured to display the intended or actual results of an orthodontic treatment plan applied to a dental arch scanned by the scanning system 154. The results may include 3D virtual representations of the dental arch, 2D images or renditions of the dental arch, etc.

The segmentation and assessment system 158 may include a computer system, including memory and one or more processors, configured to assess and improve the quality and accuracy of a 3D dental model of a patient's dentition. In one implementation, the segmentation and assessment system 158 is configured to process scan data from the scanning system 154. In some examples, 2D or 3D scan data may be processed to generate a 3D dental model or 3D dental mesh. The segmentation and assessment system 158 may be further configured extract relevant information from the 3D dental model or mesh, such as upper/lower jaw masking, tooth segmentation information including tooth numbering, and/or tooth edge information. The segmentation and assessment system 158 may include segmentation engine(s) 160, quality assessment engine(s) 164, and treatment planning engine(s) 168. One or more of the modules of the segmentation and assessment system 158 may be coupled to each other or to modules not shown.

The treatment planning engine(s) 168 may be configured to receive and/or use the segmented 3D dental model to generate, store, and/or provide instructions to implement orthodontic (dental) treatment plans and/or the results of orthodontic treatment plans. The treatment planning engine(s) 168 may provide the results of orthodontic treatment plans through a 3D dental model. In some embodiments, the 3D dental model can be rendered into one or more 2D image(s) from a plurality of viewing angles. The treatment planning engine(s) 168 may model the results of an application of orthodontic aligners to the subject's dental arch over the course of an orthodontic treatment plan. In some implementations, the treatment planning engine(s) 168 generate or form, indirectly or directly, any feasible dental appliance, including a series of aligners for a patient to wear to implement a dental/orthodontic treatment plan.

Figure 1B:
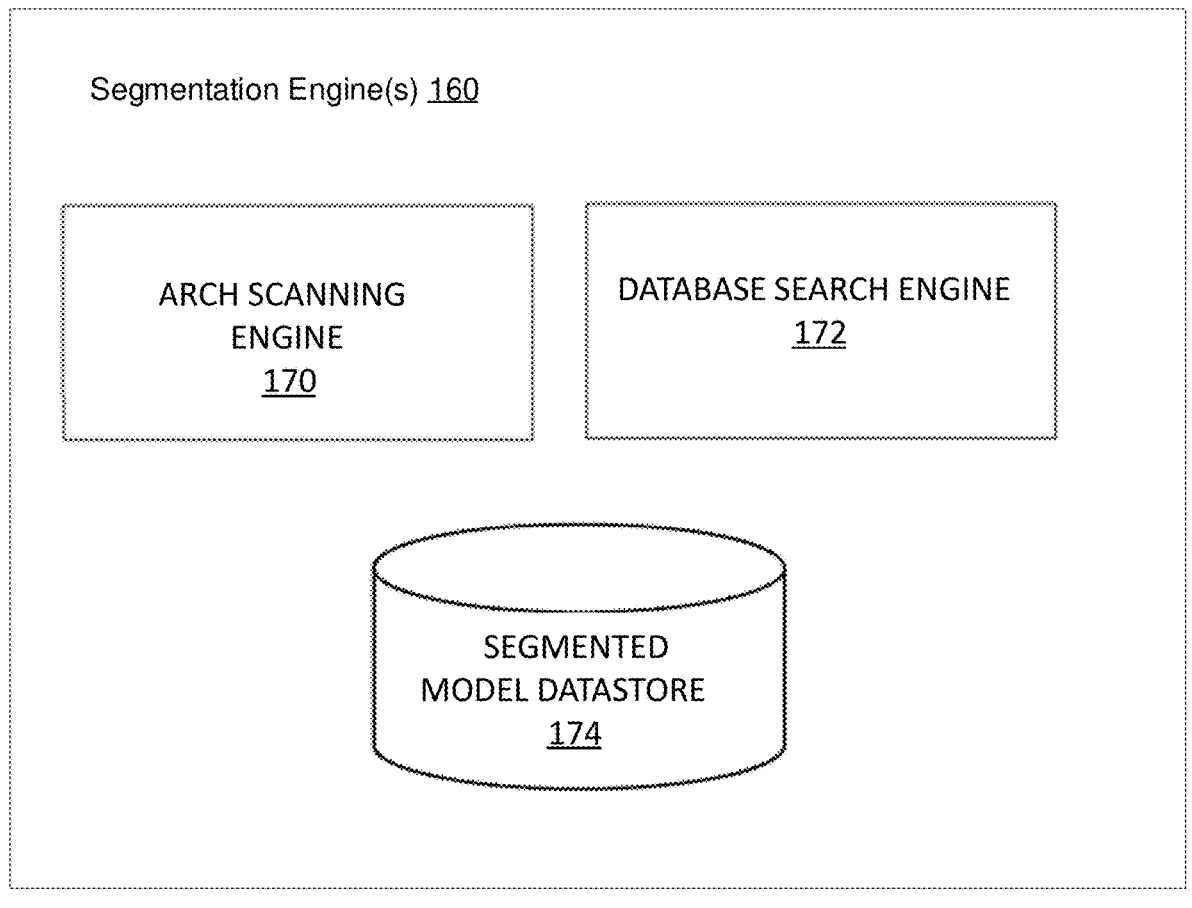
FIG. 1B is a diagram showing the segmentation engine(s) of FIG. 1A.

FIG. 1B is a diagram showing the segmentation engine(s) 160 of FIG. 1A. The segmentation engine(s) 160 may implement automated agents to configured to process tooth scans and/or 3D dental models from the scanning system 154. The segmentation engine(s) 160 may include graphics engines to process images or scans of a dental arch. In some implementations, the initial segmentation engine(s) 160 is configured to format scan data from a scan of a dental arch into a dental mesh model (e.g., a 3D dental model) of the dental arch. The segmentation engine(s) 160 may also be configured to segment the 3D dental model of the dental arch into individual dental components, including segmenting the 3D dental model into 3D models of individual teeth. During segmentation, the segmentation engine(s) 160 may be configured to automatically and accurately label the teeth of the 3D dental model, e.g., by numbering the teeth in a standard tooth numbering. The 3D dental models of the dental arch and/or the individual teeth may comprise geometric point clouds or polyhedral objects that depict teeth and/or other elements of the dental arch in a format that can be rendered on the dentition display system 156. In some embodiments, the 3D dental models of the dental arch and/or the individual teeth can be rendered into a 2D image. The 3D dental models may include 3D tooth shape representations in the form of a tooth point cloud, a tooth mesh, or a reduced parameter representation.

Figure 1C:
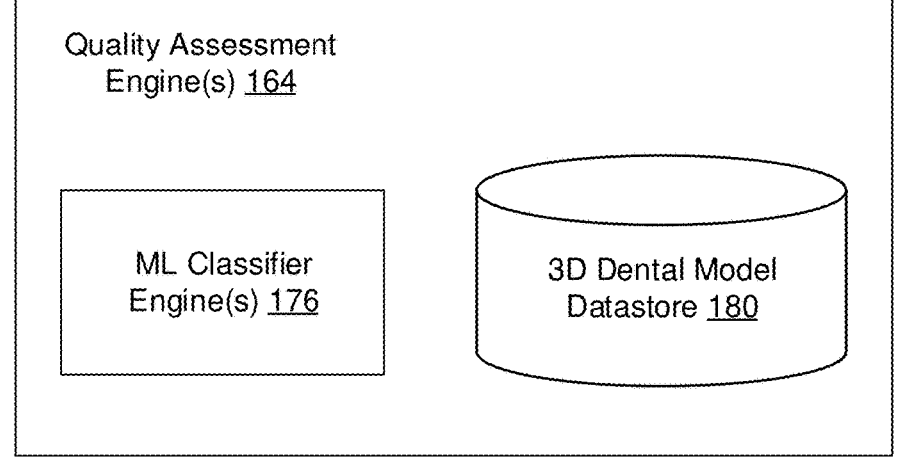
FIG. 1C is a diagram showing the quality assessment engine(s) of FIG. 1A.

FIG. 1C is a diagram showing the quality assessment engine(s) 164 of FIG. 1A. The quality assessment engine(s) 164 may include one or more machine learning (ML) classifier engine(s) 176 and a 3D dental model Datastore 180. The ML classifier engine(s) 176 may include one or more processors, memory, communication interfaces, and the like to execute ML operations to assess the quality of one or more segmented 3D dental models. In some implementations, the ML classifier engine(s) 176 may include one or more neural networks that have been trained to classify segmented 3D dental models for follow-on use with dental planning software, routines, procedures, operations, or the like. In some implementations, the ML classifier engine(s) 176 may include a first ML classifier engine and a second ML classifier engine. The first and second ML classifier engines may be trained with different training data. For example, the first ML classifier engine may be trained on training data regarding trimming plane errors and the second ML classifier engine may be trained on training data regarding scan artifacts, extra teeth, and missing teeth. The 3D dental model datastore 180 may include non-transitory computer-readable storage of instructions to perform ML classifier operations. In some implementations, the 3D dental model datastore 180 may include one or more training databases (e.g., training data) that may be used to train the ML classifier engine(s) 176 including any feasible neural networks included within the ML classifier engine(s) 176.

ML classifier engine(s) 176 may improve implementations of the computing environment 100 by providing a properly trained neural network that quickly and efficiently (with respect to prior implementations) determines whether a segmented 3D dental model is acceptable for use with treatment planning, including dental or orthodontic treatment planning. The ML classifier engine(s) 176 may classify a segmented 3D dental model based on being trained with training data based on thousands, tens of thousands (or more) of labeled 3D dental models. Prior to using the ML classifier engine(s) 176, the classification of segmented 3D dental models would be performed manually by highly skilled and/or trained personnel. Thus, the ML classifier engine(s) 176 enable the computing environment 100 to automatically review and classify a subject's segmented 3D dental model without the use of highly skilled and trained personnel. Furthermore, the ML classifier engine(s) 176 allow the classification of segmented 3D dental models based on complex characteristics and features extracted a large body of training data. In many instances, the body of training data may be too large for a human to assimilate and effectively use to classify segmented 3D dental models.

As used herein, any "engine" may include one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, "datastores" may include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in nontrivial ways. The implementation of a data structure usually entails writing a set of procedures that create and manipulate instances of that structure. The datastores described herein can be cloud-based datastores. A cloud based datastore is a datastore that is compatible with cloud-based computing systems and engines.

Figure 2:
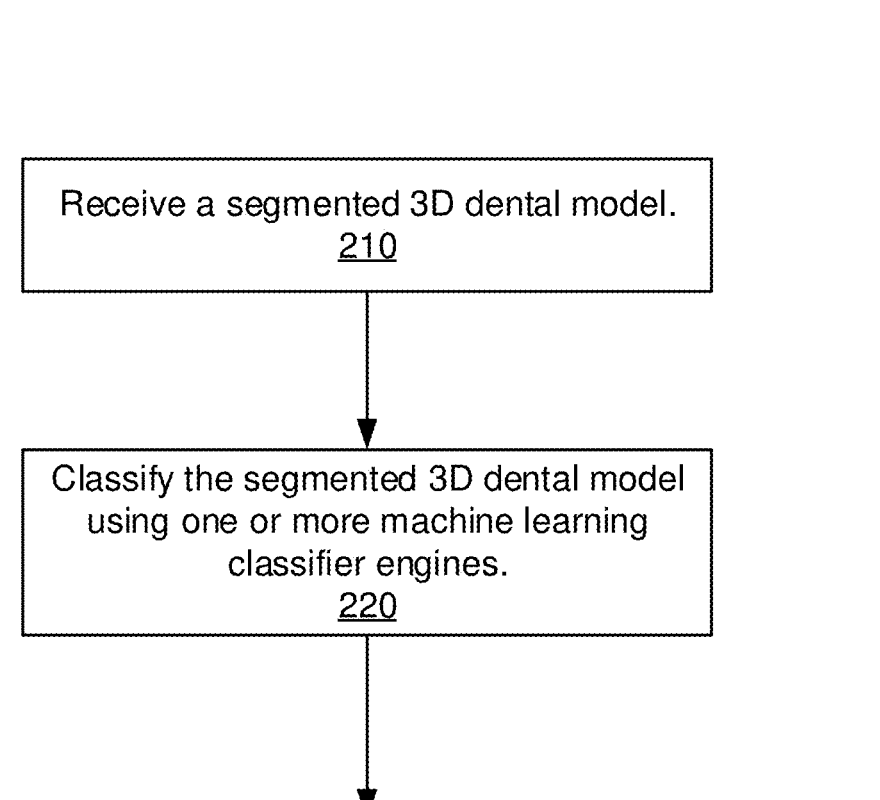
FIG. 2 shows a flowchart showing an example method for classifying a segmented 3D dental model.

FIG. 2 shows a flowchart showing an example method 200 for classifying a segmented 3D dental model. Some examples may perform the operations described herein with additional operations, fewer operations, operations in a different order, operations in parallel, and some operations differently. The method 200 is described below with respect to the computing environment 100 of FIG. 1A, however, the method 200 may be performed by any other suitable system, device, or apparatus.

The method 200 begins in block 210 as the computing environment 100 receives a segmented 3D dental model of a subject's dentition. The segmented 3D dental model may have originated from a scanner, such as an intraoral scanner or by scanning a mold of the patient's dentition. In some examples, the scanning system 154 of FIG. 1A may provide a 3D dental model that may thereafter be automatically segmented by the segmentation and assessment system 158. The 3D dental model may be automatically segmented into individual parts or sections, including individual teeth, gingiva, tooth edges, jaw structures, or the like. However, in some cases the automatic segmentation of a 3D dental model may include one or more segmentation errors. The segmentation errors may introduce extra teeth or in some cases may miss teeth in a subject's dentition. In some cases, segmentation errors may include errors caused by unusual anatomy or trimming errors from the segmentation process.

Next, in block 220 the computing environment 100 classifies the segmented 3D dental model using one or more machine learning classifier engines. Classification of the segmented 3D dental model assigns or attaches one of two classifications or categories to the segmented 3D dental models. In some cases, the classification may be a pass/fail classification or some other similar binary classification. Thus, the classification can indicate whether the segmented 3D dental model is suitable for use with a subject's dental treatment planning. Dental treatment planning may include determining a series of aligners for use in providing orthodontic treatment.

The machine learning classifier engines may include neural networks trained with labeled training data. The labeled training data may include segmented 3D dental images that may be selected to illustrate various segmentation errors. Segmentations errors may include missing teeth, extra teeth, trimming errors, scanning artifacts, unusual anatomy, or the like.

In some examples, the segmentation errors may present differently for different age groups (e.g., age classifications). Thus, in some examples the labeled training data may include dental images associated with, or limited to particular age groups. In this manner, the computing environment 100 may receive an indication of an age classification and execute a machine learning classifier engine based on a received age classification of a subject. In some examples, the age classifications may include adult, child, and/or infant age classifications.

In some implementations, the computing environment 100 the machine learning classifier engines are trained using a training database comprising automatically segmented 3D dental models, corresponding scan data, and age classification scored for (e.g., labeled for) one or more of: trimming plane errors, scan artifact errors, extra teeth errors, and missing teeth errors. Some example trimming plane errors include trimming plane errors that comprise one or more of: missing and/or incorrectly placed trimming planes, and non-terminal teeth trimmed.

Scan artifact errors may include any feasible errors associated with segmenting a 3D dental model. Some scan artifacts may include excess or absence of non-dental anatomic material, interproximal (IP) material bridging between teeth or teeth and gingiva, and/or orthodontic appliance material on the teeth. Missing teeth errors may include erupting or partially erupted teeth. In some examples, an extra tooth error may include one tooth segmented as multiple teeth.

Next, in block 230 the computing environment 100 passes the segmented 3D dental model to a treatment planning engine based on the classification, or otherwise re-segmenting the 3D dental model. In some implementations, a segmented 3D dental model may be classified (by a classifier engine) to one of two possible classifications. If the segmented 3D dental model has a first classification (e.g., has a pass classification), then the computing environment 100 passes the segmented 3D dental to a treatment planning engine. On the other hand, if the segmented 3D dental model has a second classification of two possible classifiers (e.g., has a fail classification), then the computing environment 100 re-segments the 3D dental model. Thus, passing or failing of a segmented 3D dental model may be based on a qualitative and/or quantitative aggregate value from the one or more ML classifier engines (e.g., the value of the classification may be above or within a passing threshold).

In some examples, the computing environment 100 can implement a treatment planning engine similar to the treatment planning engine 168 of FIG. 1. The computing environment 100 may use a "pass" classified segmented 3D dental model to determine a treatment plan with a treatment planning engine. The treatment planning engine(s) 168 may be configured to receive and/or use the segmented 3D dental model to generate, store, and/or provide instructions to implement orthodontic (dental) treatment plans and/or the results of orthodontic treatment plans. In some examples, the treatment planning engine may model the results of an application of orthodontic aligners to the subject's dental arch over the course of an orthodontic treatment plan. In some implementations, the treatment planning engine generates, indirectly or directly, a series of aligners (e.g., dental appliances) for a patient to wear to implement a dental/orthodontic treatment plan.

FIG. 3 shows a flowchart showing another example method 300 for classifying a segmented 3D dental model. In block 310, the computing environment 100 receives a segmented 3D dental model, scan data, and an age classification of a subject. The segmented 3D dental model may be any segmented 3D dental model as described herein. Scan data may include 2D or 3D scanning data from a dental scanner. As described herein, the scanning data may be provided by a camera, an intraoral scanner, an x-ray device, an infrared device, or the like. In some implementations, the scanning system 154 of FIG. 1 may be configured to produce scan data of the subject's dentition. Age classification may be provided to the computing environment 100 by a clinician.

In some examples, the age classification may include adult, child, and infant classifications.

Next in block 320, the computing environment 100 classifies the segmented 3D dental model using one or more trained machine learning classifier engines. In some implementations, the computing environment 100 may use one or more machine learning classifier engines trained using a training database to classify automatically segmented 3D dental models. The machine learning classifier engines may also use corresponding scan data, and age classifications. The segmented 3D dental models may be scored for and one or more of: missing or incorrectly placed trimming planes (trimming plane errors), excess or absence of non-dental anatomic material, extra teeth, and missing teeth.

Next in block 330, the computing environment 100 passes the segmented 3D dental model to a treatment planning engine based on the classification (e.g., score), or otherwise re-segmenting the 3D dental model. In some implementations, the computing environment 100 may process the segmented 3D dental model similar to as described with respect to block 230 of FIG. 2. In some implementations, re-segmenting a 3D dental model may include passing or providing the 3D dental model to an alternative segmentation engine (in some cases another implementation of the segmentation engine(s) 160. In some other implementations, re-segmenting the 3D dental model include manually segmenting the 3D dental model by a trained and skilled technician. Re-segmentation may include a partial or complete segmentation of the 3D dental model.

Training of the machine learning classifier engines described above with respect to FIGS. 2 and 3 may be supervised training through the use of labeled training data. Training of the machine learning classifier engines is described below with respect to FIG. 4.

FIG. 4 shows a flowchart showing an example method 400 for training a machine learning classifier engine. As described herein, machine learning classifier engines can receive and classify images, such as segmented 3D dental models, and associate the dental modes with a category/classification. In some implementations, the category/classification may be a pass or fail. The category and/or classification may describe the segmented 3D dental image's viability for use in developing or determining a dental or orthodontic treatment plan.

The method begins in block 410 as the computing environment 100 receives labeled training data. Labeled training data may include any number of segmented 3D dental models (in some cases dental images). The segmented 3D dental models may be based on processed dental scan data, such as data from cameras, intraoral scanners, x-ray devices, infrared devices, or the like. Each received segmented 3D dental model may be associated with a label. The associated label may indicate whether the segmented 3D dental model is acceptable for use in determining a dental treatment plan. For example, a segmented 3D dental model may be associated with a "pass," "good," "acceptable," label or the like if the segmented 3D model has been determined to not include any segmentation errors. As described herein, segmentation errors may include trimming errors (trimming plane errors), excess or absence of non-dental anatomic material, extra teeth, missing teeth, or a combination thereof. On the other hand, a segmented 3D dental model may be associated (labeled) with a "fail," "not good," or "unacceptable" label if the segmented 3D model has been determined to include any segmentation errors.

Next, in block 420 the computing environment 100 trains a machine learning model to classify segmented 3D dental models using the received labeled training data. For example, the computing environment 100 may train neuron, neural networks, or the like to classify segmented 3D dental models. In some implementations, the computing environment 100 may classify 3D dental models into one of two classifications: a pass (or equivalent) classification and a fail (or equivalent) classification. Thus, the training described in block 420 may be supervised by use of the labeled training data received in block 410.

In some implementations, the computing environment 100 may execute linear classifiers, support vector machines, decision trees or algorithms to predict or determine a classifier or category associated with any segmented 3D dental model.

The labeled training data may embody or illustrate, by example, the application of any number of rules for classifying or categorizing segmented 3D dental models. Advantageously, each and every rule does not need to be described with long descriptions, instructions, flowcharts and the like. Instead, the machine learning model is trained to follow or implement rules through the labeled training data. Examples of some rules for classifying or categorizing is illustrated with flowcharts described below.

Figure 5:
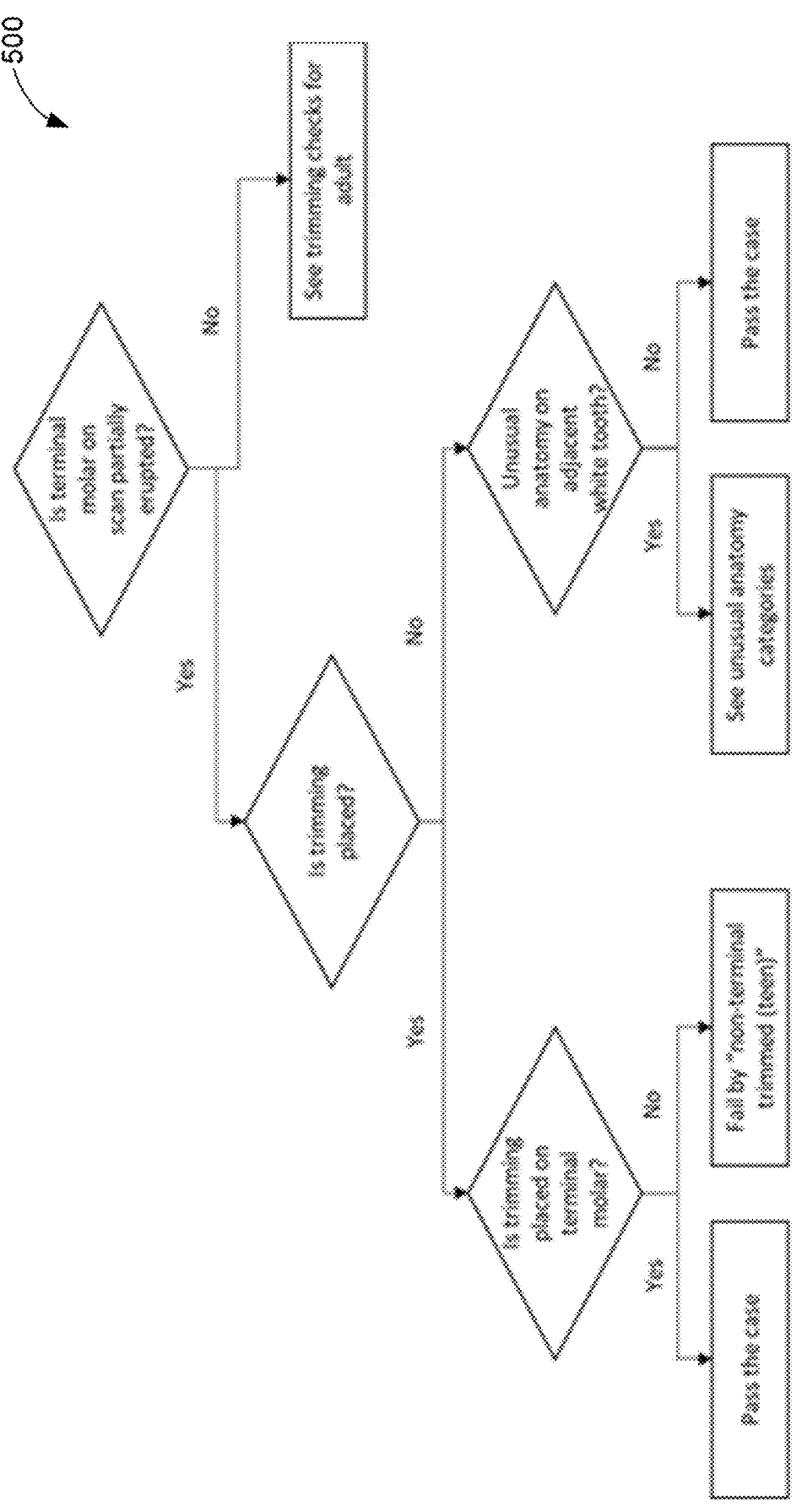
FIG. 5 is a flowchart showing an example of a decision tree for classifying or categorizing a segmented 3D dental image with respect to trimming errors.
Figure 6:
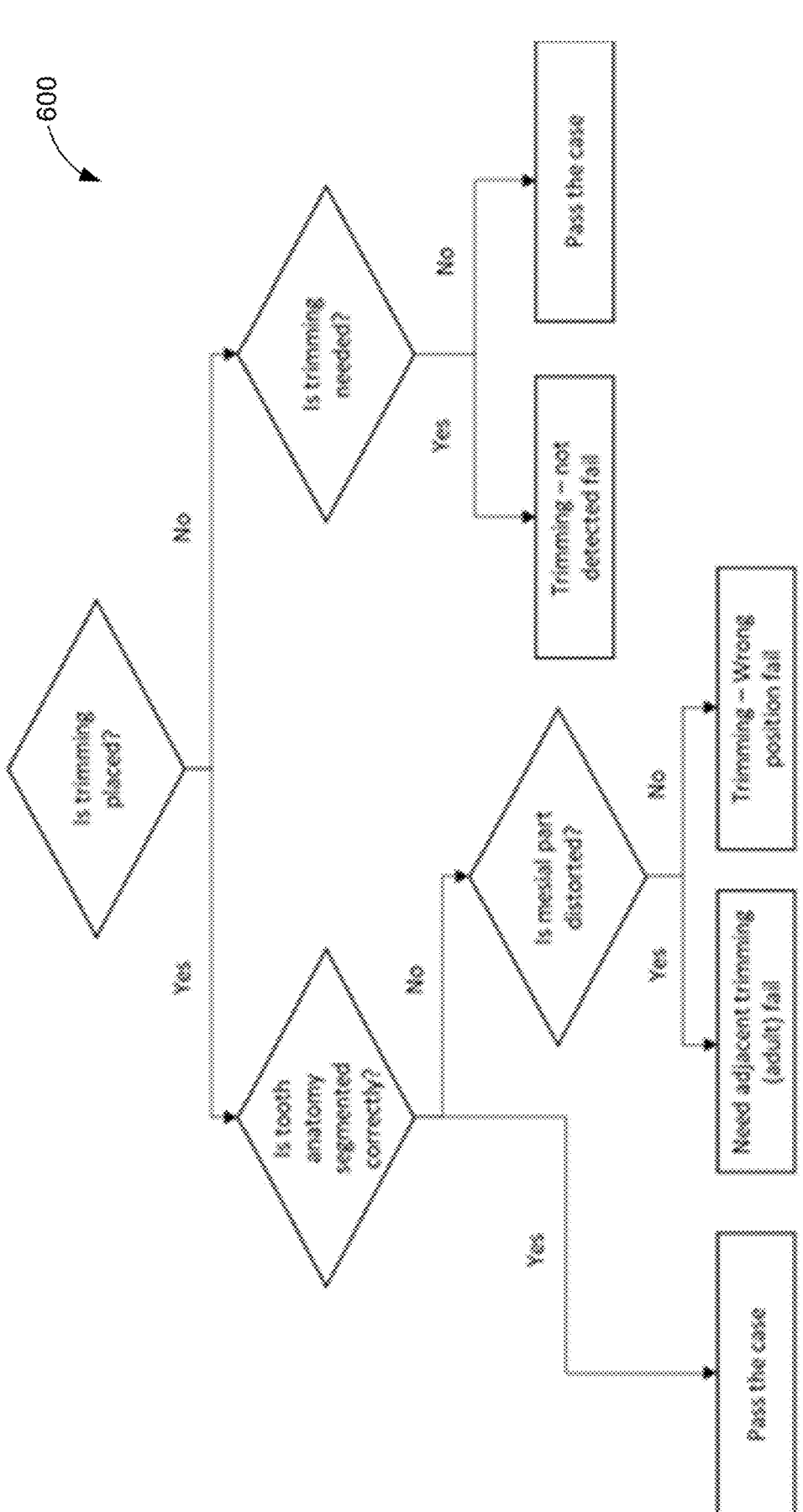
FIG. 6. is a flowchart showing an example of a decision tree for classifying or categorizing segmented 3D dental images of adult subjects, e.g., for adult trimming quality detection.
Figure 7:
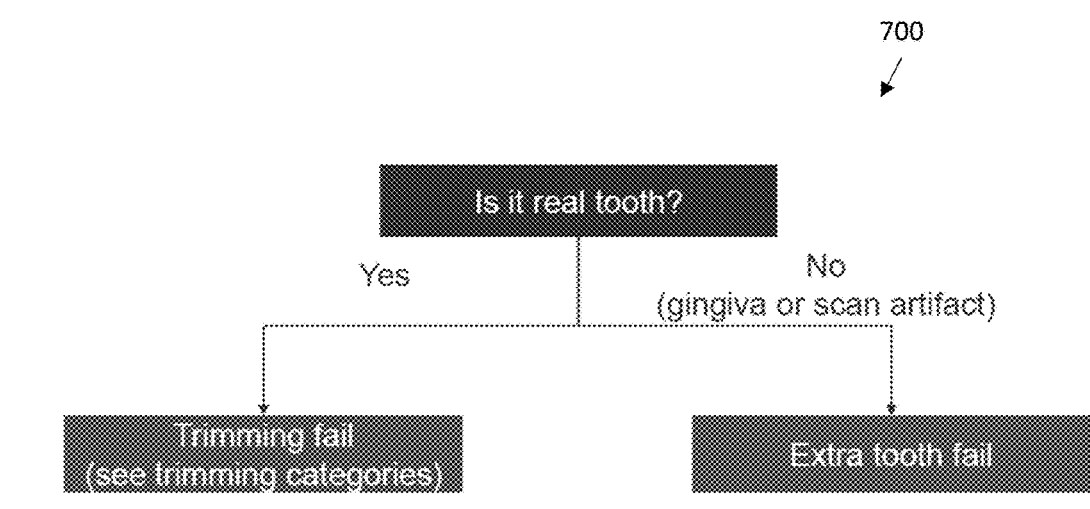
FIG. 7 is an example of a flowchart 700 showing a decision tree for classifying segmented 3D dental images based on detecting or determining that the image includes gingiva occluding or obscuring a tooth or detecting or determining that the image includes a scan artifact, e.g., for laser molar trimming.
Figure 8:
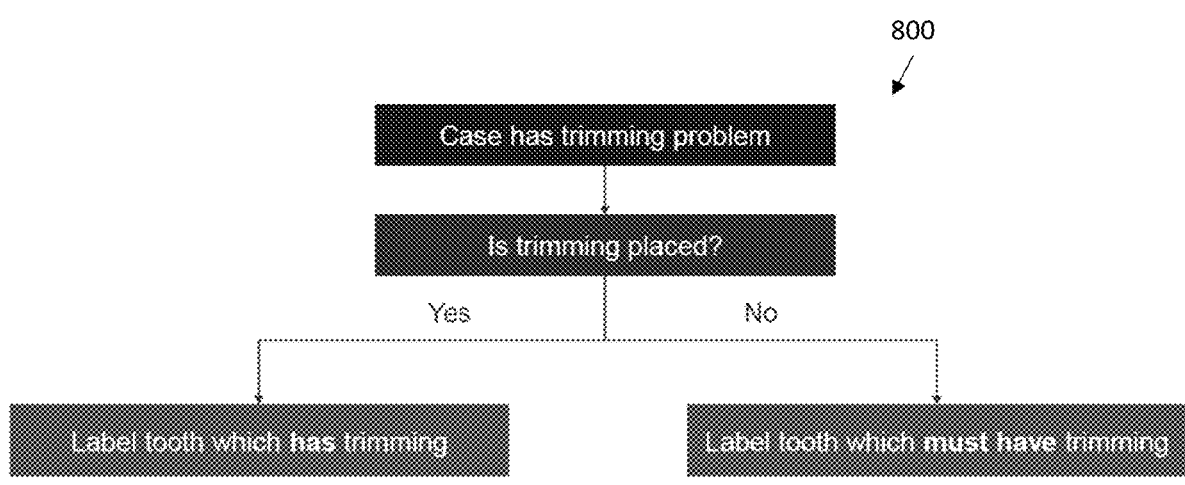
FIG. 8 is an example of a flowchart 800 showing a decision tree for classifying segmented 3D dental images based on detecting or determining that the image includes a trimming problem.

FIG. 5 is a flowchart 500 showing a decision tree for classifying or categorizing a segmented 3D dental image with respect to trimming errors. The flowchart 500 may be applicable to segmented 3D dental images of teen (young adult) subjects. FIG. 6. Is a flowchart 600 showing a decision tree for classifying or categorizing segmented 3D dental images of adult subjects. FIG. 7 is a flowchart 700 showing a decision tree for classifying segmented 3D dental images based on detecting or determining that the image includes gingiva occluding or obscuring a tooth or detecting or determining that the image includes a scan artifact. FIG. 8 is a flowchart 800 showing a decision tree for classifying segmented 3D dental images based on detecting or determining that the image includes a trimming problem (e.g., a trimming plane error, or the like).

As described herein, the machine learning model may be trained to classify or categorize segmented 3D dental images with labeled segmented 3D dental images. The labels may indicate a pass or a fail that indicates whether the training image has or illustrates good segmentation results or poor (unacceptable) segmentation results. FIGS. 9-35 show trimmed segmented 3D dental models that may be used as training images. Thus, the FIGS. 9-35 may include 3D dental models with trimming plane errors, scan artifacts, extra teeth, and/or missing teeth. Some of the training images may be associated with particular age ranges of the subjects or patients. Thus, the machine learning model may be trained using particular age classifications or ranges.

Figures 9A, 9B, 9C, 10A, 10B, 10C, 10D:
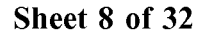
Figures 14A, 14B, 14C, 14D, 15A, 15B, 15C, 15D:
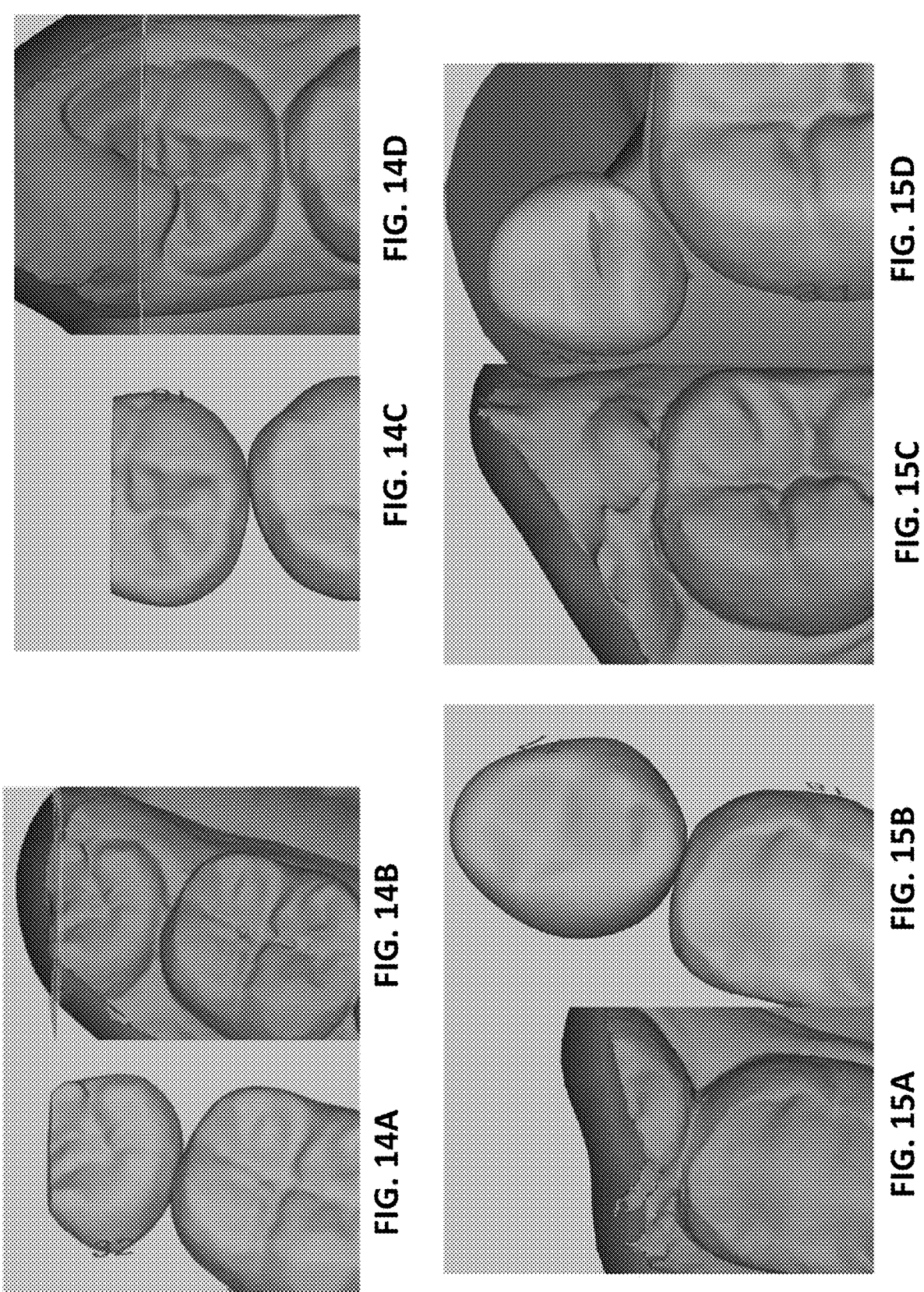
FIGS. 14A-14D shows examples of images of trimmed 3D models of a patient's teeth having trimming errors that may be used for training a neural network as described herein.
FIGS. 15A-15D shows examples of images of trimmed 3D models of a patient's teeth having trimming errors that may be used for training a neural network as described herein.

FIGS. 9A-9C shows example images of trimmed segmented 3D dental models. The images illustrate segmentation errors associated with a teen subject. In some cases, a non-terminal (adjacent) tooth is trimmed. Since the images have errors, the images 900 may be labeled "fail," "unacceptable," or the like.

FIGS. 10A-10K shows example images of trimmed segmented 3D dental models. The images show good (acceptable) segmentation for teen subjects. In some cases, incorrect trimming (trimming errors) on partially erupted teeth for teen subjects is acceptable. Since the images are acceptable, the images may be labeled "pass," "acceptable," or the like.

FIGS. 11A-11D shows example images of trimmed segmented 3D dental models. The images are associated with adjacent tooth trimming errors in adult subjects. The images show a tooth that is trimmed and has a remaining part that has unusual anatomy or is covered by gingiva. In some examples, a mesial part of the tooth may be distorted and cannot be reconstructed. Since the images have errors, the images 1100 may be labeled "fail," "unacceptable," or the like.

FIGS. 12A-12F shows example images (pairs) of trimmed segmented 3D dental models. The images are associated with adjacent tooth trimming errors in adult subjects. The images show a tooth that has been trimmed but also has unusual anatomy or is covered by gingiva. Since the images have errors, the images may be labeled "fail," "unacceptable," or the like.

FIGS. 13A-13F shows examples of paired images of trimmed segmented 3D dental models. The images include tooth trimming errors. The images include fully erupted teeth that are trimmed and have a remaining part that has unusual anatomy or is covered by gingiva. In some examples, a trimming plane may be changed to remove a distorted portion of the 3D image. Since the images have errors, the images may be labeled "fail," "unacceptable," or the like.

FIGS. 14A-14D shows example images (paired images) of trimmed segmented 3D dental models. The images also include trimming errors. The images show a fully erupted tooth that is at least partially trimmed and has a remaining part that includes unusual anatomy or is covered by gingiva. In some cases, the trimming error may be overcome or removed by changing the trimming plane to remove the distorted or erroneous portion of the 3D dental model. Since the images have errors, the images may be labeled "fail," "unacceptable," or the like.

FIGS. 15A-15D shows example images of trimmed segmented 3D dental models. The images show trimming errors. In particular, the images include teeth that may be missed and not shown after the trimming operation. In some cases a terminal tooth may have unusual anatomy or may be wholly or partially covered by gingiva. In some other cases, the terminal tooth may be reconstructed too aggressively. Since the images have errors, the images may be labeled "fail," "unacceptable," or the like.

Figures 16A, 16B, 17A, 17B, 17C, 17D:
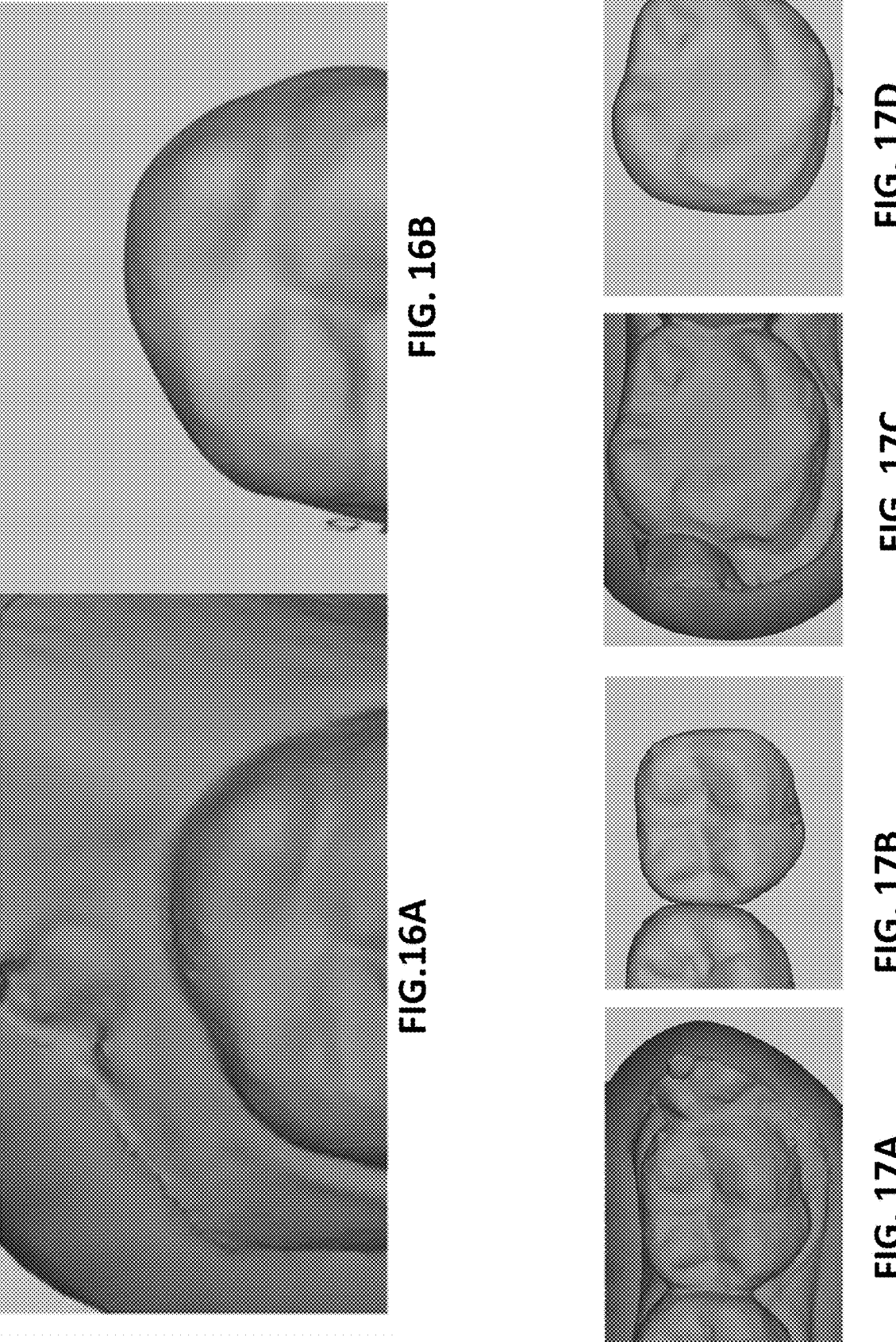
FIGS. 16A-16B shows an example of a trimmed 3D model of a patient's teeth having a trimming error that may be used for training a neural network as described herein.
FIGS. 17A-17D shows examples of images of trimmed 3D models of a patient's teeth having trimming errors and missing teeth that may be used for training a neural network as described herein.

FIGS. 16A-16B shows example paired images 1600 of a trimmed segmented 3D dental model. The images include one or more trimming errors. In particular, the images show a trimming error that has resulted in a terminal tooth missing from the trimmed image. Since the images have errors, the images may be labeled "fail," "unacceptable," or the like.

FIGS. 17A-17D shows example images of trimmed segmented 3D dental models. The images include trimming errors associated with missing teeth. Similar to the images of FIGS. 16A-16B, the trimming error shown in FIGS. 17A-17D may result in a terminal tooth missing from the trimmed image. Since the images have errors, the images may be labeled "fail," "unacceptable," or the like.

Figures 18A, 18B, 19A, 19B, 19C:
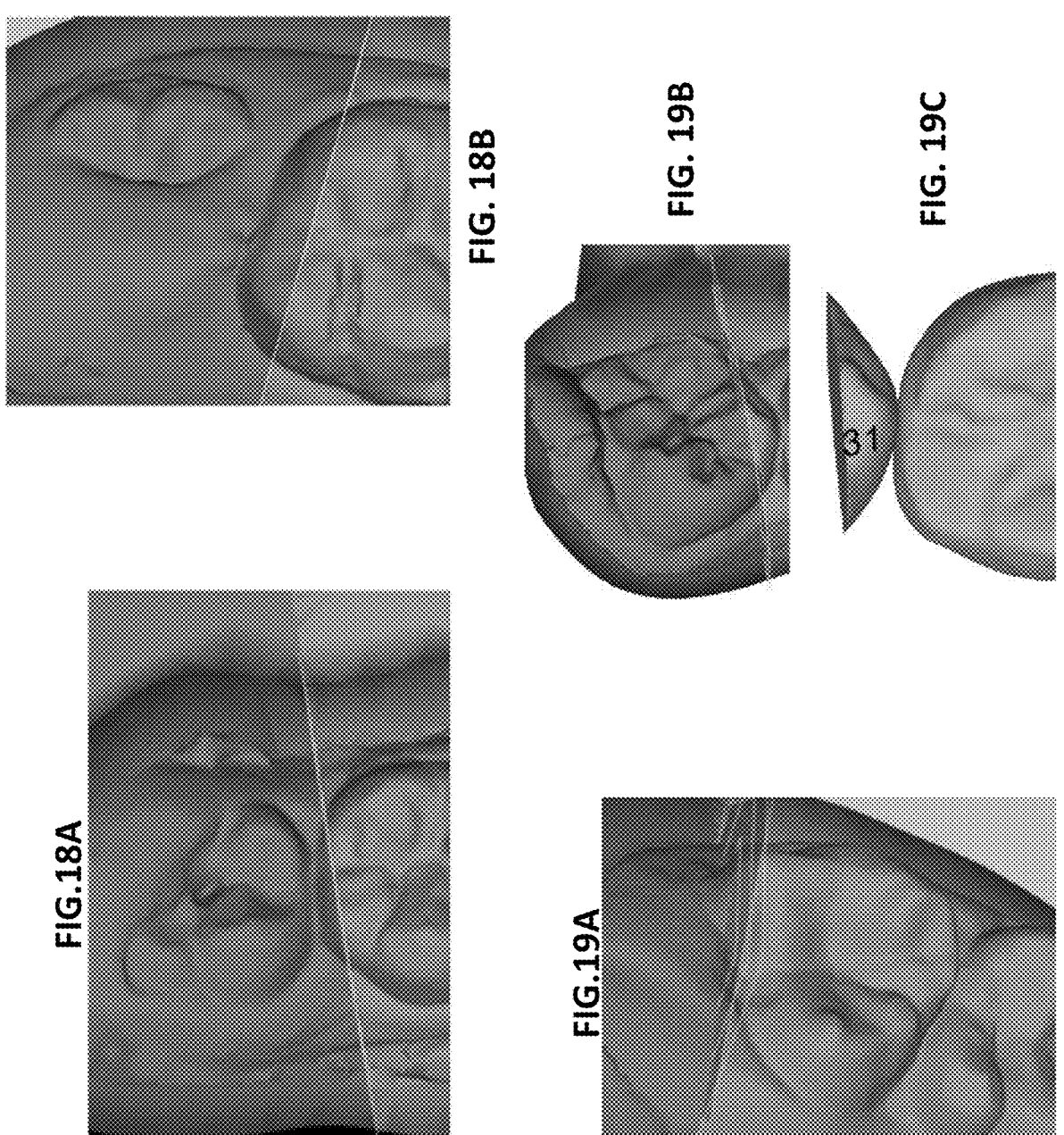
FIGS. 18A-18B shows examples of images of trimmed non-terminal teeth in adult subjects that may be used for training a neural network.
FIGS. 19A-19C shows examples of acceptable images of trimmed teeth that may be used for training a neural network.
Figures 21A, 21B, 21C, 21D:
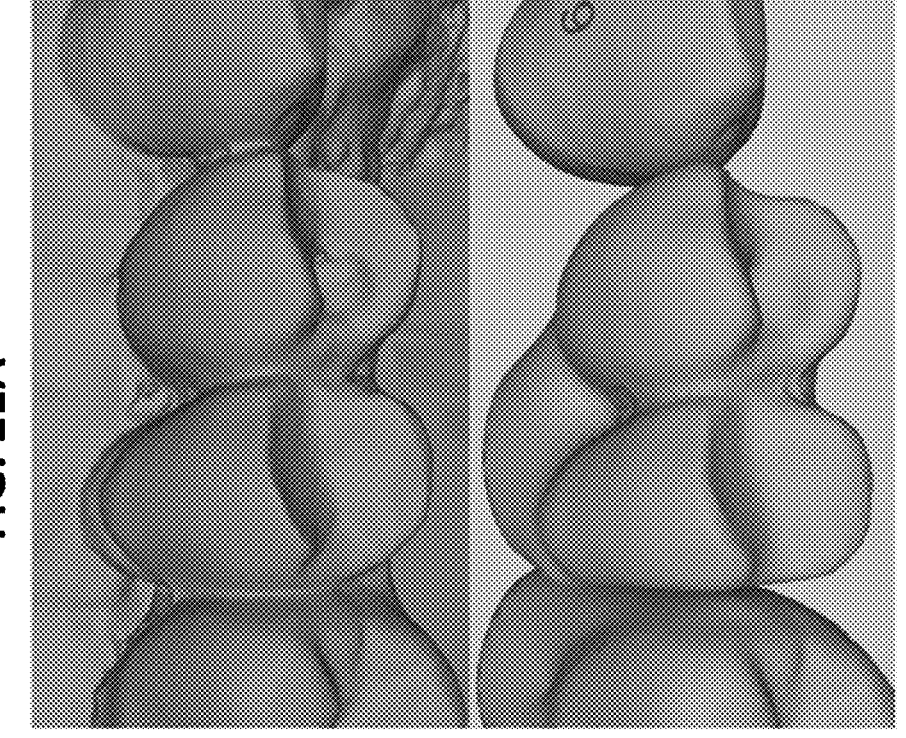
FIGS. 21A-21D shows examples of images that are not correctly segmented and may be joined together or missing altogether, which may be used for training a neural network.
Figures 22A, 22B, 22C, 22D:
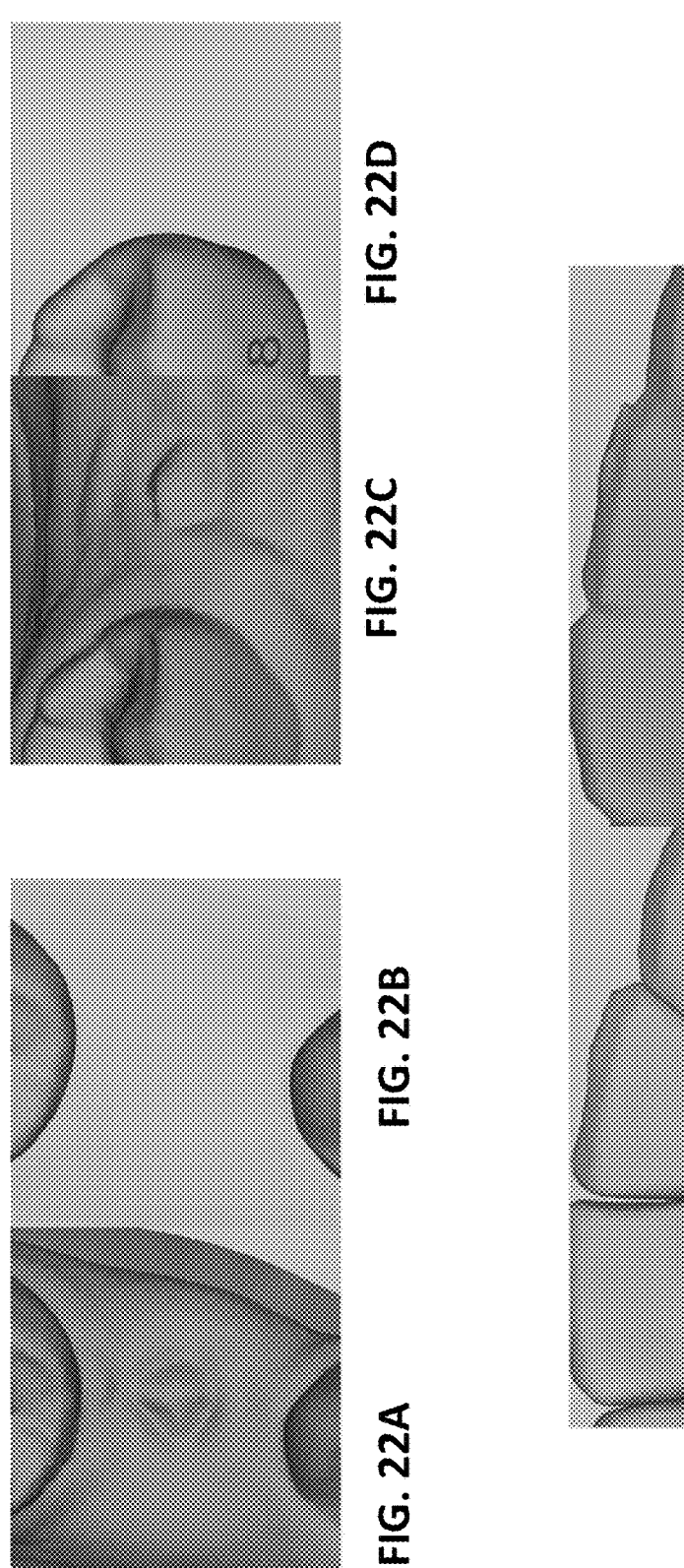
FIGS. 22A-22D shows examples of images of trimmed 3D models of a patient's teeth that do not include partially erupted teeth and may be used for training a neural network.

FIGS. 18A-18B shows example images of a trimmed segmented 3D dental model. In particular, the images show trimmed non-terminal teeth in adult subjects. The images are acceptable. Thus, the images may be labeled "pass," "acceptable," or the like. Trimming of non-terminal teeth is acceptable in adult subjects.

FIGS. 19A-19C shows example images including trimmed segmented 3D dental models. The images include acceptable images of trimmed teeth. The images are acceptable. Thus, the images may be labeled "pass," "acceptable," or the like.

FIGS. 20A-20F shows example images of a trimmed segmented 3D dental model. The images show teeth of a 3D dental model that have been reconstructed aggressively, but correctly. Thus, the images are acceptable. The images may be labeled "pass," "acceptable," or the like.

FIGS. 21A-21D shows example images of trimmed segmented 3D dental models. The images show teeth that are not correctly segmented and may be joined together or missing altogether. Thus, the images may be labeled "fail," "unacceptable," or the like.

Figures 23A, 23B:
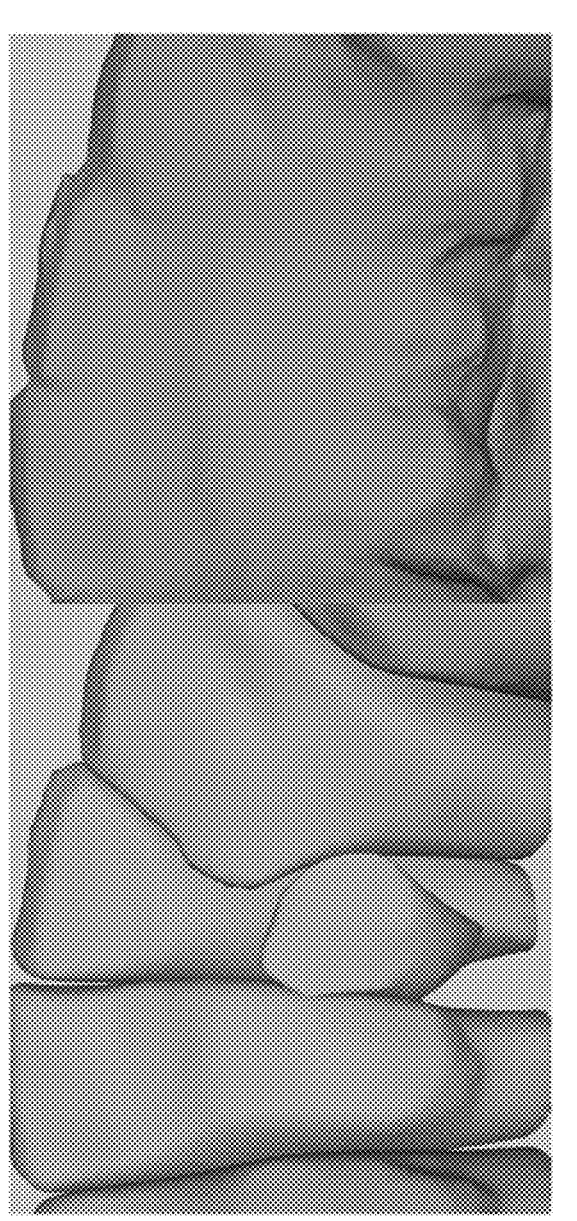
FIGS. 23A-23B shows examples of images of trimmed 3D models of a patient's teeth showing segmentation errors that may be used for training a neural network.

FIGS. 22A-22D shows example images of trimmed 3D dental models. The images show trimmed 3D dental models that do not include partially erupted teeth. These images are acceptable. Thus, the images may be labeled "pass," "acceptable," or the like FIGS. 23A-23B shows example images of a trimmed 3D dental model. In some implementations, the images show segmentation errors. For example, the images show extra teeth errors that combine two (or more) teeth into a single tooth. In some cases, a single tooth may be segmented into two or more teeth. Since the images include errors, the images may be labeled "fail," "unacceptable," or the like.

FIGS. 24A-24D shows example images of trimmed segmented 3D dental models. In some implementations, the images show segmented 3D dental models that include erupting or partially erupting teeth for teen subjects. Since erupting or partially erupting teeth for teen subjects are acceptable, the images may be labeled "pass," "acceptable," or the like.

FIGS. 25A-25F shows example images of trimmed segmented 3D dental models. In some implementations, the images show segmented 3D dental models that include dental appliances that are incorrectly included as part of the subject's dentition. Since the images show incorrect tooth images, the images may be labeled "fail," "unacceptable," or the like.

FIGS. 26A-26B shows example images of a trimmed segmented 3D dental model. In some implementations, the images show excess (or show an absence) of material that does not match with actual anatomy, particularly on buccal and/or lingual surfaces. Since the images show erroneous anatomy, the images may be labeled "fail," "unacceptable," or the like.

FIGS. 27A-27F shows example images of trimmed segmented 3D dental models. In some implementations, the images show unusual anatomy. In particular, the images show an excess of material that does not match with actual anatomy, particularly on buccal and/or lingual surfaces. Since the images show erroneous anatomy, the images may be labeled "fail," "unacceptable," or the like.

FIGS. 28A-28D show example images of trimmed segmented 3D dental models. In particular, FIG. 28A (and FIG. 28B) shows an image with unusual anatomy. In some implementations, the image shows an absence or excess of material that does not match with actual anatomy of an occlusal surface of a tooth. Since the image is in error, the image may be labeled "fail," "unacceptable," or the like. FIG. 28C also shows an image with unusual anatomy. FIG. 28D also shows an absence or excess of material that does not match with actual anatomy on an occlusal surface of a tooth. Since the image is in error, the image may be labeled "fail," "unacceptable," or the like.

Figure 29C:
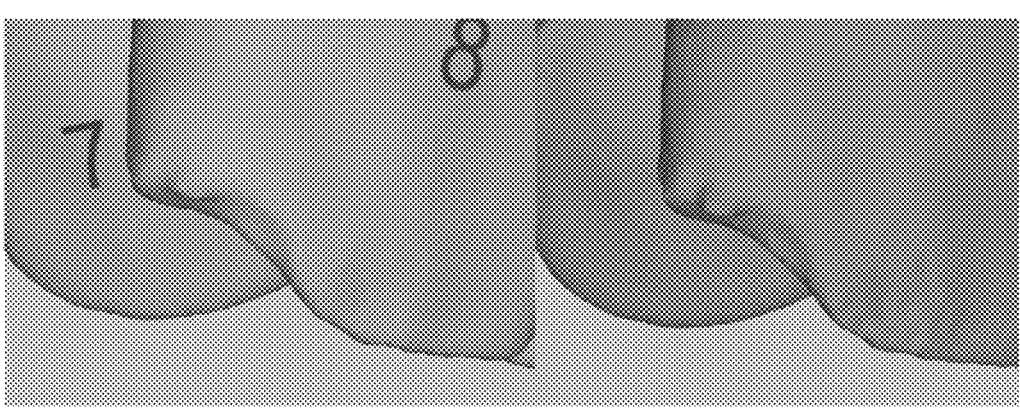
Figure 29D:
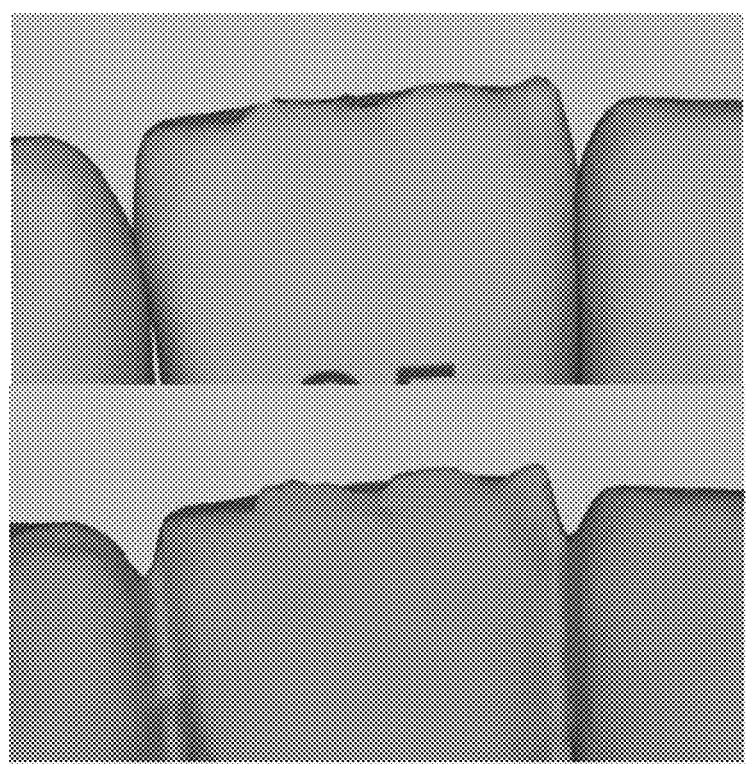

FIGS. 29A-29B and 29C-29D show example images of trimmed segmented 3D dental models. In particular, FIG. 29A shows an image with unusual anatomy. The image illustrates a segmentation error associated with an incisal surface. Since the image shows an erroneous image, the image may be labeled "fail," "unacceptable," or the like. FIG. 29C also shows an image with a segmentation error associated with an incisal surface. Since the image shows an erroneous image, the image may be labeled "fail," "unacceptable," or the like.

FIGS. 30A-30B and 30C-30D show example images of trimmed segmented 3D dental models. In particular, FIG. 30A shows an image with unusual anatomy. The image illustrates a segmentation error associated with an incisal surface. Since the image shows an erroneous image, the image may be labeled "fail," "unacceptable," or the like. FIG. 30B also shows an image (FIG. 30D) with a segmentation error associated with an incisal surface. Since the image shows an erroneous image, the image may be labeled "fail," "unacceptable," or the like.

FIGS. 31A-31B shows an example image of a trimmed segmented 3D dental model. In particular, the image shows an unusual anatomy associated with an incisal surface. However, in this example image, the incisal surface is acceptable. Thus, the image may be labeled "pass," "acceptable," or the like.

Figures 32C, 32D:
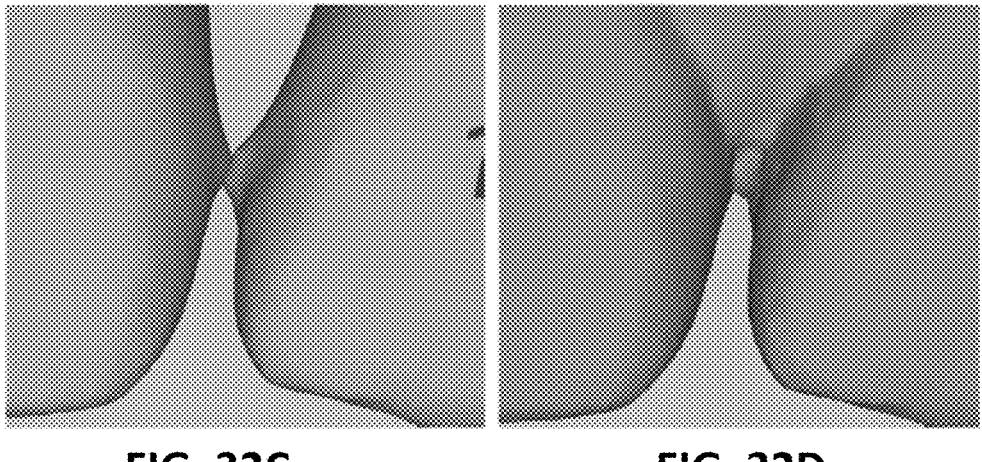
Figures 32E, 32F:
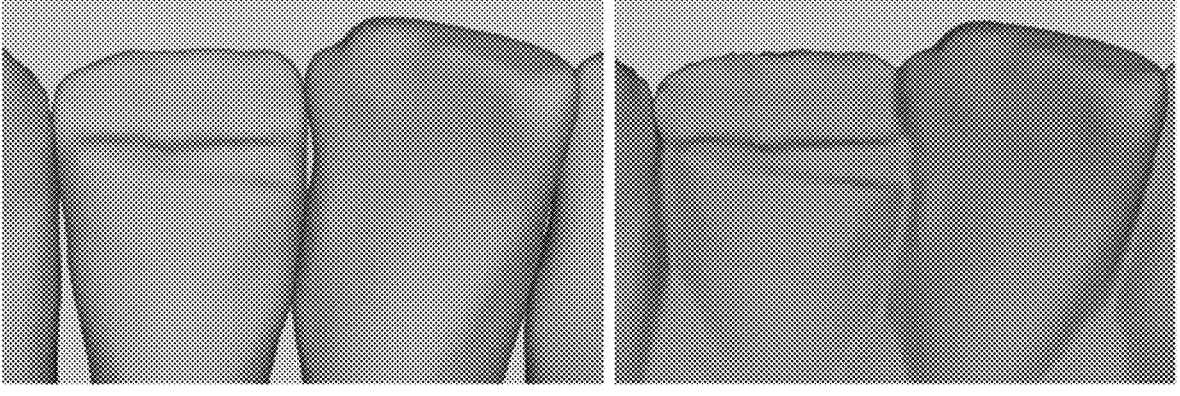
Figure 32I:
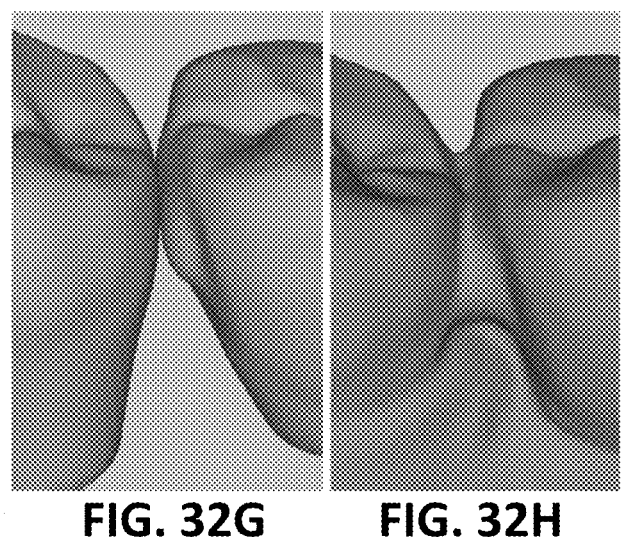
Figure 32J:
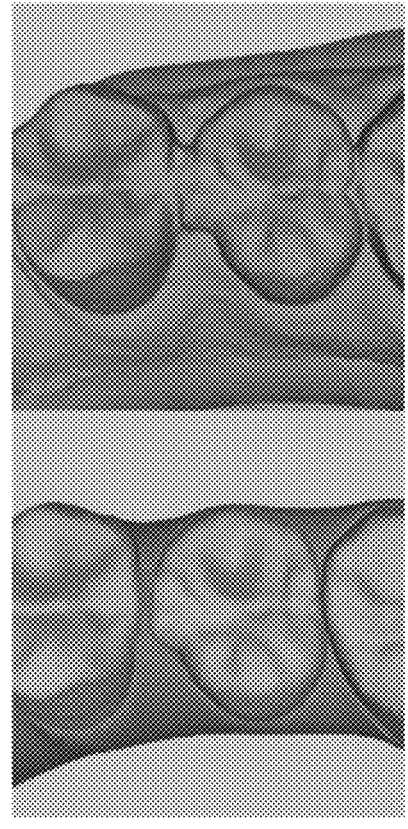

FIGS. 32A-32E show example images of trimmed segmented 3D dental models. In particular, FIGS. 32A-32E illustrate segmentation errors associated with unusual anatomies concerning interproximal spaces. FIG. 32A shows an image with an incorrect interproximal space. FIG. 32C shows an image with an interproximal space error. FIG. 32E shows an image with an interproximal space error where the interproximal space has been removed (interproximal material is bridging between teeth or teeth and gingiva). FIG. 32G shows an image with an interproximal space error. FIG. 32H incorrectly shows two teeth joined together. FIG. 32I shows an image with an interproximal space error. FIG. 32I also shows multiple teeth incorrectly joined together. Since these images have errors, these images may be labeled "fail," "unacceptable," or the like.

FIGS. 33A-33D show example images of trimmed segmented 3D dental models. In particular, FIG. 33A shows an image that includes an unusual interproximal space, however the interproximal space, as shown, is acceptable. FIG. 33C shows an image with an unusual interproximal space, but the interproximal space, as shown, is acceptable. Thus, these images may be labeled "pass," "acceptable," or the like.

FIGS. 34A-34D show example images of trimmed segmented 3D dental models. In particular, FIG. 34A shows an image that includes incorrect root surfaces. Similarly, FIG. 34C shows an image that also includes incorrect root surfaces. Since the images have errors, these same images may be labeled "fail," "unacceptable," or the like.

FIGS. 35A-35G show examples images of trimmed segmented 3D dental models. FIG. 35A shows an image that includes incorrect teeth. FIG. 35C shows an image that includes an incorrectly segmented tooth. FIG. 35E shows an image that includes a fully incorrect tooth. FIG. 35G shows image that includes another fully wrong tooth. As these images all include errors, they may be labeled "fail," "unacceptable," or the like.

Figure 36:
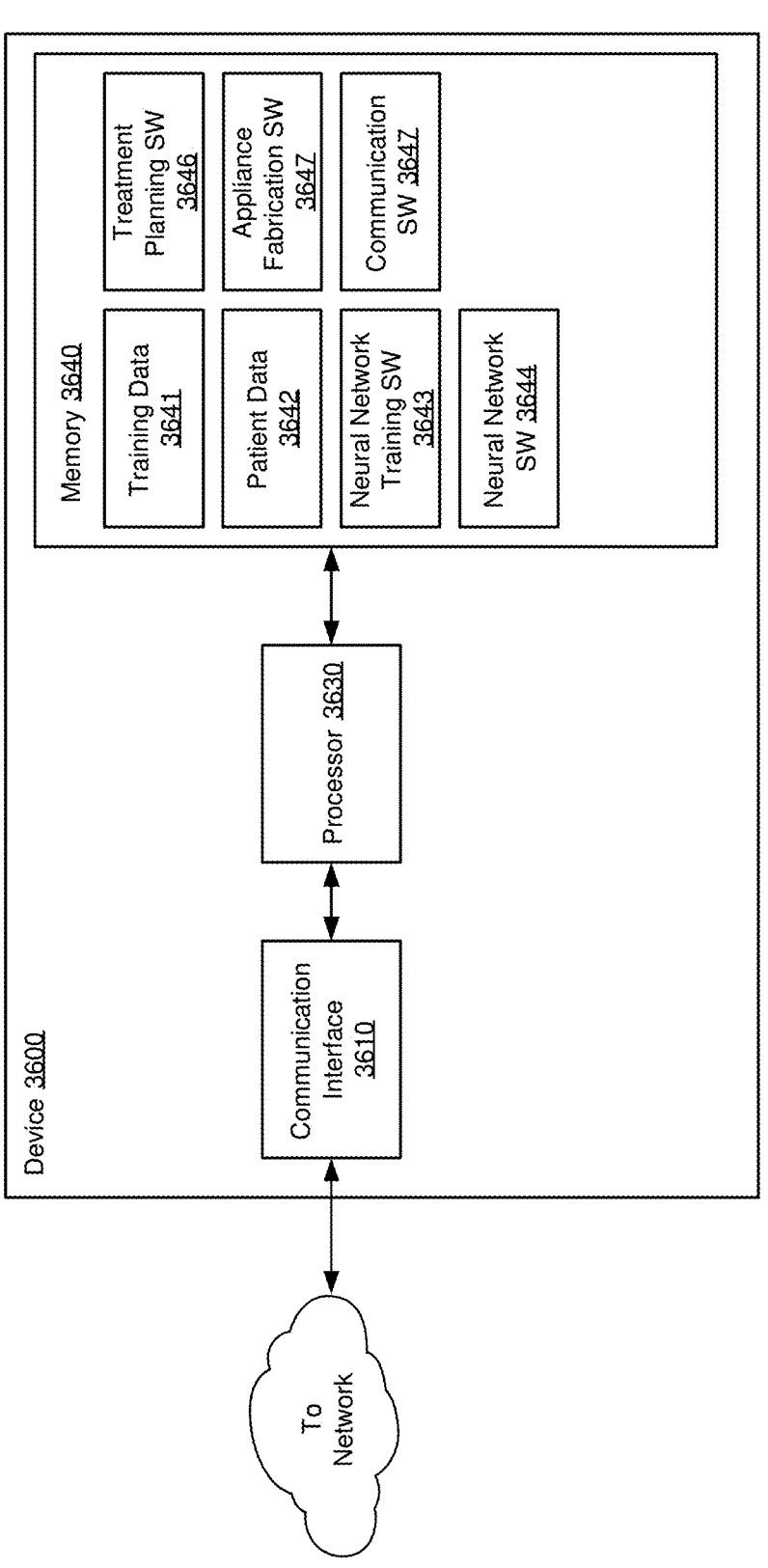
FIG. 36 shows an example of a block diagram of a device 3600 that may be one example of the computing environment 100 of FIG. 1.

FIG. 36 shows a block diagram of a device 3600 that may be one example of the computing environment 100 of FIG. 1. Although described herein as a device, the functionality of the device 3600 may be performed by any feasible apparatus, system, or method. The device 3600 may include a communication interface 3610, a processor 3630, and a memory 3640.

The communication interface 3610, which may be coupled to a network and to the processor 3630, may transmit signals to and receive signals from other wired or wireless devices, including remote (e.g., cloud-based) storage devices, cameras, processors, compute nodes, processing nodes, computers, mobile devices (e.g., cellular phones, tablet computers and the like) and/or displays. For example, the communication interface 3610 may include wired (e.g., serial, ethernet, or the like) and/or wireless (Bluetooth, Wi-Fi, cellular, or the like) transceivers that may communicate with any other feasible device through any feasible network. In some examples, the communication interface 3610 may receive training data 3641 and/or patient data 3642.

The processor 3630, which is also coupled to the memory 3640, may be any one or more suitable processors capable of executing scripts or instructions of one or more software programs stored in the device 3600 (such as within memory 3640).

The memory 3640 may include training data 3641. The training data 1041 may include a plurality labeled segmented 3D dental models that include a variety 3D dental features and characteristics. The training data 1041 may illustrate acceptable and unacceptable segmented 3D dental models.

The memory 3640 may also include patient data 3642. The patient data 3642 may include one or more segmented 3D dental models that are to be evaluated by the device 3600 to determine whether the segmented 3D dental model is acceptable for use in determining a dental treatment plan. In some examples, the patient data 3642 may include scan data from one or more of cameras, intraoral scanners, x-ray devices, infrared devices, or the like.

The memory 3640 may also include a non-transitory computer-readable storage medium (e.g., one or more non-volatile memory elements, such as EPROM, EEPROM, Flash memory, a hard drive, etc.) that may store a neural network training software (SW) module 3643, a neural network SW module 3644, a treatment planning SW module 3646, and an appliance fabrication SW module 3647. Each software module includes program instructions that, when executed by the processor 3630, may cause the device 3600 to perform the corresponding function(s). Thus, the non-transitory computer-readable storage medium of memory 3640 may include instructions for performing all or a portion of the operations described herein The processor 3630 may execute the neural network training SW module 3643 to train one or more neural networks to perform one or more of the operations discussed with respect to FIGS. 1-35. In some examples, execution of the neural network training SW module 3643 may cause the processor 3630 to collect or obtain training data (such as labeled segmented 3D dental images within the training data 3641) and train a neural network using the training data 3641. The trained neural network may be stored as one or more neural networks in the neural network training SW module 3643.

The processor 3630 may execute one or more neural networks in the neural network SW module 3644 to assess a subject's segmented 3D dental model (which may be stored in the patient data 3642) to determine whether the dental model is suitable for use with treatment planning software.

The processor 3630 may execute the treatment planning SW module 3646 to generate and store a patient's treatment plan. In some examples, execution of the treatment planning SW module 3646 may use an approved (acceptable) segmented 3D dental model to determine a dental or orthodontic treatment plan.

The processor 1030 may execute the appliance fabrication SW module 3647 to generate aligner data that, in turn, may be used to fabricate one or more aligners. For example, execution of the appliance fabrication SW module 3647 may use patient data and treatment preferences stored in the memory 3640 to generate aligner data for a series of aligners.

In general, these methods and apparatuses (systems, devices, etc., including software, hardware and/or firmware) for checking and/or correcting the segmentation quality of a dental (intraoral) scan may include any of the components described herein, as illustrated and described in FIGS. 1-9 and 36, discussed above, which may collectively be referred to as segmentation correction (or in some examples, segmentation verification) modules, may be used at one or more parts of a dental computing environment, including as part of an intraoral scanning system, doctor system, treatment planning (e.g., technician) system, patient system, and/or fabrication system. In particular, these methods and apparatuses may be used as part of a treatment planning system.

Figure 37:
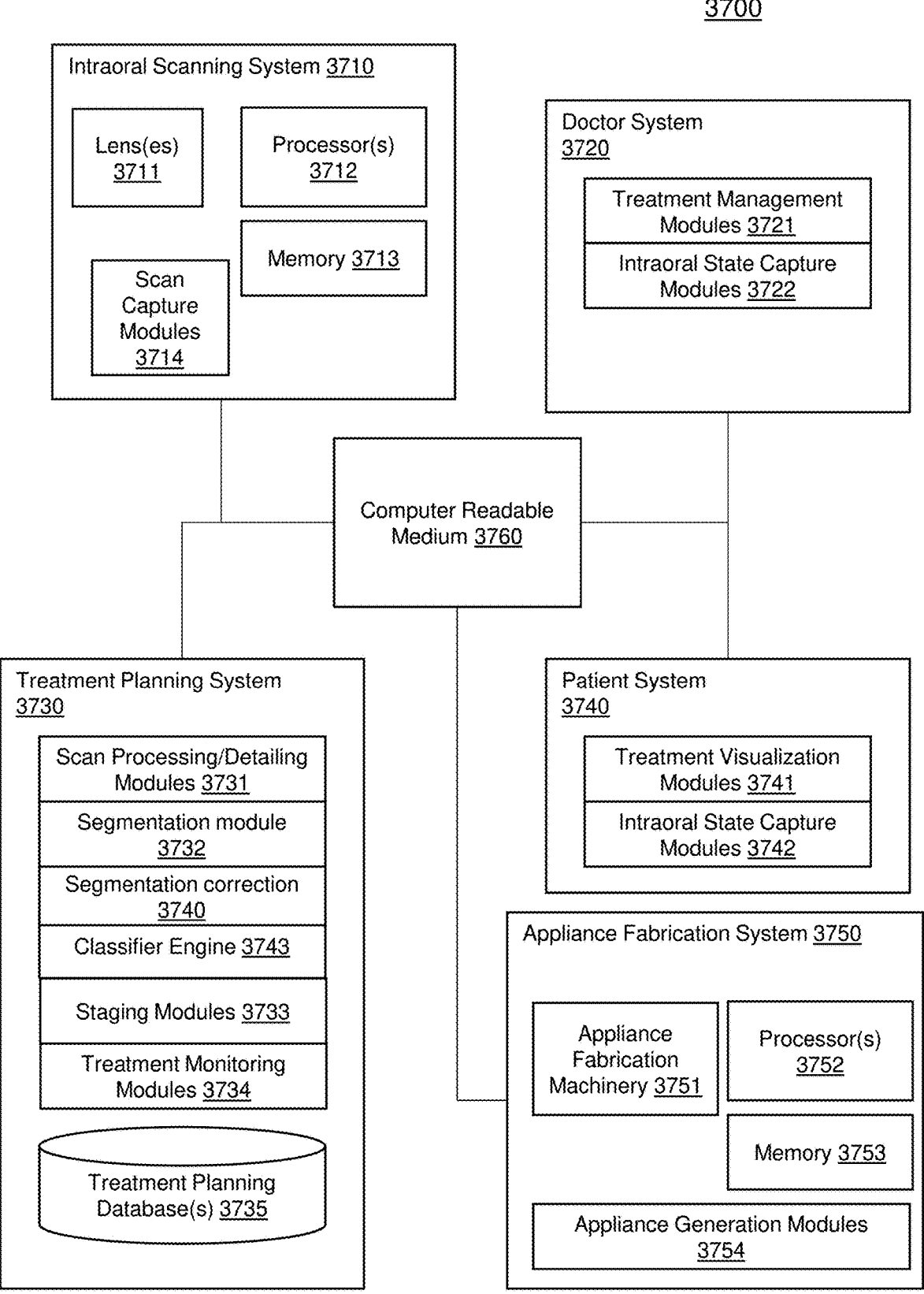
FIG. 37 shows a diagram illustrating an example of a computing environment including the segmentation correction module(s), described herein.

FIG. 37 is a diagram illustrating one variation of a computing environment 3700 that may generate one or more orthodontic/dental appliances and/or treatment plans specific to a patient, and fabricate dental appliances that may accomplish the treatment plan to treat a patient, under the direction of a dental professional. The example computing environment 3700 shown in FIG. 37 includes an intraoral scanning system 3710, a doctor system 3720, a treatment planning system 3730 (e.g., technician system), a patient system 3740, an appliance fabrication system 3750, and computer-readable medium 3760. Each of these systems may be referred to equivalently as a sub-system of the overall system (e.g., computing environment). Although shown as discrete systems, some or all of these systems may be integrated and/or combined. In some variations a computing environment (dental computing system) 3700 may include just one or a subset of these systems (which may also be referred to as sub-systems of the overall system 3700). As mentioned, one or more of these systems may be combined or integrated with one or more of the other systems (subsystems), such as, e.g., the patient system and the doctor system may be part of a remote server accessible by doctor and/or patient interfaces. The computer readable medium 3760 may divided between all or some of the systems (subsystems); for example, the treatment planning system and appliance fabrication system may be part of the same sub-system and may be on a computer readable medium 3760. Further, each of these systems may be further divided into sub-systems or components that may be physically distributed (e.g., between local and remote processors, etc.) or may be integrated.

An intraoral scanning system may include an intraoral scanner as well as one or more processors for processing images. For example, an intraoral scanning system 3710 can include optics 3711 (e.g., one or more lenses, filters, mirrors, etc.), processor(s) 3712, a memory 3713, and a scan capture module 3714. In general, the intraoral scanning system 3710 can capture one or more images of a patient's dentition. Use of the intraoral scanning system 3710 may be in a clinical setting (doctor's office or the like) or in a patient-selected setting (the patient's home, for example). In some cases, operations of the intraoral scanning system 3710 may be performed by an intraoral scanner, dental camera, cell phone or any other feasible device.

The optical components 3711 may include one or more lenses and optical sensors to capture reflected light, particularly from a patient's dentition. The scan capture module 3714 can include instructions (such as non-transitory computer-readable instructions) that may be stored in the memory 3713 and executed by the processor(s) 3712 to can control the capture of any number of images of the patient's dentition.

In FIG. 37 the segmentation 3732 and verification 3732 (e.g., segmentation correction module(s) 3740, classifier engine 3743) are shown as part of the treatment planning sub-system 3730, however in some examples some, or all, of these components may be part of (or duplicated in) the intraoral scanning system 3710. For example, the segmentation module 3732 may be in the intraoral scanning sub-system 3710 or another sub-system and the segmentation correction module(s) 3740 may be in the treatment planning sub-system 3730 or some other sub-system. In some examples the classifier engine 3743 may be integrated with the segmentation correction 3740 module(s). Any of the component systems or sub-systems of the dental computing environment 3700 may access or use the segmented data.

The doctor system 3720 (e.g., doctor sub-system) may include a treatment management module 3721 and an intraoral state capture module 3722 that may access or use the 3D model based on the segmented data. The doctor system 3720 may provide a "doctor facing" interface to the computing environment 3700. The treatment management module 3721 can perform any operations that enable a doctor or other clinician to manage the treatment of any patient. In some examples, the treatment management module 3721 may provide a visualization and/or simulation of the patient's dentition with respect to a treatment plan. This user interface may also include display the segmentation.

The intraoral state capture module 3722 can provide images of the patient's dentition to a clinician through the doctor system 3720. The images may be captured through the intraoral scanning system 3710 and may also include images of a simulation of tooth movement based on a treatment plan.

In some examples, the treatment management module 3721 can enable the doctor to modify or revise a treatment plan, particularly when images provided by the intraoral state capture module 3722 indicate that the movement of the patient's teeth may not be according to the treatment plan. The doctor system 3720 may include one or more processors configured to execute any feasible non-transitory computer-readable instructions to perform any feasible operations described herein.

Alternatively or additionally, the treatment planning system 3730 may include any of the methods and apparatuses described herein. The treatment planning system 3730 may include scan processing/detailing module 3731, segmentation module 3732, segmentation correction module(s) 3740, classifier engine(s) 3743, staging module 3733, and treatment monitoring module 3734, and a treatment planning database(s) 3735. In general, the treatment planning system 3730 can determine a treatment plan for any feasible patient. The scan processing/detailing module 3731 can receive or obtain dental scans (such as scans from the intraoral scanning system 3710) and can process the scans to "clean" them by removing scan errors and, in some cases, enhancing details of the scanned image. The treatment planning system 3730 may perform segmentation. For example, a treatment planning system may include a segmentation module 3732 that can segment a dental model into separate parts including separate teeth, gums, jaw bones, and the like. In some cases, the dental models may be based on scan data from the scan processing/detailing module 3731 and/or segmentation data from the segmentation module and segmentation correction modules 3740 (and/or classifier engine 3743).

The segmentation correction module(s) 3740 may be configured to operate as the device 3600 shown in FIG. 36, discussed above.

The staging module 3733 may determine different stages of a treatment plan. Each stage may correspond to a different dental aligner. The staging module 3733 may also determine the final position of the patient's teeth, in accordance with a treatment plan. Thus, the staging module 3733 can determine some or all of a patient's orthodontic treatment plan. In some examples, the staging module 3733 can simulate movement of a patient's teeth in accordance with the different stages of the patient's treatment plan.

An optional treatment monitoring module 3734 can monitor the progress of an orthodontic treatment plan. In some examples, the treatment monitoring module 3734 can provide an analysis of progress of treatment plans to a clinician. Although not shown here, the treatment planning system 3730 can include one or more processors configured to execute any feasible non-transitory computer-readable instructions to perform any feasible operations described herein.

The patient system 3740 can include a treatment visualization module 3741 and an intraoral state capture module 3742. In general, the patient system 3740 can provide a "patient facing" interface to the computing environment 3700. The treatment visualization module 3741 can enable the patient to visualize how an orthodontic treatment plan has progressed and also visualize a predicted outcome (e.g., a final position of teeth).

In some examples, the patient system 3740 can capture dentition scans for the treatment visualization module 3741 through the intraoral state capture module 3742. The intraoral state capture module can enable a patient to capture his or her own dentition through the intraoral scanning system 3710. Although not shown here, the patient system 3740 can include one or more processors configured to execute any feasible non-transitory computer-readable instructions to perform any feasible operations described herein.

The appliance fabrication system 3750 can include appliance fabrication machinery 3751, processor(s) 3752, memory 3753, and appliance generation module 3754. In general, the appliance fabrication system 3750 can directly or indirectly fabricate aligners to implement an orthodontic treatment plan. In some examples, the orthodontic treatment plan may be stored in the treatment planning database(s) 3735. Any of these apparatuses and methods may be configured to include the step of fabricating one or more (e.g., a series) of dental appliances using a 3D model (e.g., including using the corrected segmentation, as described herein).

The appliance fabrication machinery 3751 may include any feasible implement or apparatus that can fabricate any suitable dental aligner. The appliance generation module 3754 may include any non-transitory computer-readable instructions that, when executed by the processor(s) 3752, can direct the appliance fabrication machinery 3751 to produce one or more dental aligners. The memory 3753 may store data or instructions for use by the processor(s) 3752. In some examples, the memory 3753 may temporarily store a treatment plan, dental models, or intraoral scans.

The computer-readable medium 3760 may include some or all of the elements described herein with respect to the computing environment 3700. The computer-readable medium 3760 may include non-transitory computer-readable instructions that, when executed by a processor, can provide the functionality of any device, machine, or module described herein.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and/or methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the individual matter may be practiced. As mentioned, other embodiments may be utilized and derived there from, such that structural and logical substitutions and changes may be made without departing from the scope of this disclosure. Such embodiments of the inventive patient matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, the method comprising:
  receiving a segmented three-dimensional (3D) dental model of a subject's dentition,
  a scan data of the subject's dentition, and an age classification of the subject;
  classifying the segmented 3D dental model using one or more trained machine learning classifier engines, wherein the one or more machine learning classifier engines are trained using a training database comprising automatically segmented 3D dental models, corresponding scan data, scan artifacts that include interproximal (IP) material bridging between teeth or teeth and gingiva, and age classification scored for and one or more of: missing or incorrectly placed trimming planes, excess or absence of non-dental anatomic material, extra teeth, and missing teeth; and
  passing the segmented 3D dental model to a treatment planning engine based on the classification, otherwise re-segmenting the segmented 3D dental model.

2. A non-transitory computer-readable storage medium storing instructions that, when executed by one or more processors, cause the one or more processor to perform a method comprising:
  receiving a segmented three-dimensional (3D) dental model of a subject's dentition, a scan data of the subject's dentition, and an age classification of the subject;
  classifying the segmented 3D dental model using one or more trained machine learning classifier engines, wherein the one or more trained machine learning classifier engines are trained using a training database comprising automatically segmented 3D dental models, corresponding scan data, scan artifacts that include interproximal (IP) material bridging between teeth or teeth and gingiva, and age classification scored for and one or more of: missing or incorrectly placed trimming planes, excess or absence of non-dental anatomic material, extra teeth, and missing teeth; and passing the segmented 3D dental model to a treatment planning engine based on the classification, otherwise re-segmenting the segmented 3D dental model.

3. A non-transitory computer-readable storage medium storing instructions that, when executed by one or more processors, cause the one or more processor to perform a method comprising:

receiving a segmented three-dimensional (3D) dental model of a subject's dentition;

classifying the segmented 3D dental model using one or more trained machine learning classifier engines, wherein the one or more trained machine learning classifier engines are trained on one or more of: trimming plane errors, scan artifacts, extra teeth, and missing teeth, wherein the scan artifacts include interproximal (IP) material bridging between teeth or teeth and gingiva; and passing the segmented 3D dental model to a treatment planning engine based on the classification, otherwise re-segmenting the segmented 3D dental model.

4. The non-transitory computer-readable storage medium of claim 3, wherein receiving comprises receiving an age classification of the subject.

5. The non-transitory computer-readable storage medium of claim 4, wherein the age classification comprises one of: adult or teen.

6. The non-transitory computer-readable storage medium of claim 3, wherein receiving comprises receiving scan data of the subject's dentition.

7. The non-transitory computer-readable storage medium of claim 3, wherein the one or more trained machine learning classifier engines are trained using a training database comprising automatically segmented 3D dental models, corresponding scan data, and age classification scored for and one or more of: trimming plane errors, scan artifacts, extra teeth, and missing teeth.

8. The non-transitory computer-readable storage medium of claim 3, wherein trimming plane errors comprises one or more of: missing and/or incorrectly placed trimming planes, and non-terminal teeth trimmed.

9. The non-transitory computer-readable storage medium of claim 3, wherein scan artifacts further comprise one or more of: excess or absence of non-dental anatomic material and orthodontic appliance material on the teeth.

10. The non-transitory computer-readable storage medium of claim 3, wherein the missing teeth comprise erupting or partially erupted teeth.

11. The non-transitory computer-readable storage medium of claim 3, wherein the extra teeth comprise at least one tooth segmented as multiple teeth.

12. The non-transitory computer-readable storage medium of claim 3, wherein classifying the segmented 3D dental model using one or more trained machine learning classifier engines comprises classifying using a first machine learning classifier engine trained on trimming plane errors, and a second machine learning classifier engine trained on: scan artifact, extra teeth, and missing teeth.

13. The non-transitory computer-readable storage medium of claim 3, wherein receiving the segmented 3D dental model comprises receiving an automatically segmented 3D dental model.

14. A method, the method comprising:

receiving a segmented three-dimensional (3D) dental model of a subject's dentition;

classifying the segmented 3D dental model using one or more trained machine learning classifier engines, wherein the one or more machine learning classifier engines are trained on one or more of: trimming plane errors, scan artifacts, extra teeth, and missing teeth, wherein the scan artifacts include interproximal (IP) material bridging between teeth or teeth and gingiva; and passing the segmented 3D dental model to a treatment planning engine based on the classification, otherwise re-segmenting the segmented 3D dental model.

15. The method of claim 14, further comprising receiving an age classification of the subject, wherein classifying the segmented 3D dental model is based on the age classification.

16. The method of claim 15, wherein the age classification comprises one of: adult or teen.

17. The method of claim 14, further comprising receiving scan data of the subject's dentition.

18. The method of claim 14, wherein classifying the segmented 3D dental model comprises using one or more trained machine learning classifier engines trained on: trimming plane errors, scan artifact, extra teeth, and missing teeth.

19. The method of claim 14, wherein the one or more machine learning classifier engines are trained using a training database comprising automatically segmented 3D dental models, corresponding scan data, and age classification scored for one or more of: trimming plane errors, scan artifacts, extra teeth, and missing teeth.

20. The method of claim 14, wherein trimming plane errors comprises one or more of: missing and/or incorrectly placed trimming planes, and non-terminal teeth trimmed.

21. The method of claim 14, wherein scan artifacts comprises one or more of: excess or absence of non-dental anatomic material, and orthodontic appliance material on the teeth.

22. The method of claim 14, wherein the missing teeth comprise erupting or partially erupted teeth.

23. The method of claim 14, wherein the extra teeth comprise at least one tooth segmented as multiple teeth.

24. The method of claim 14, further comprising forming a dental appliance from a treatment plan generated by the treatment planning engine.

25. The method of claim 14, wherein classifying the segmented 3D dental model using one or more trained machine learning classifier engines comprises classifying using a first machine learning classifier engine trained on trimming plane errors, and a second machine learning classifier engine trained on: scan artifact, extra teeth, and missing teeth.

26. The method of claim 14, wherein receiving the segmented 3D dental model comprises receiving an automatically segmented 3D dental model.

* * * * *